US009573308B2

(12) United States Patent
Chou et al.

(10) Patent No.: US 9,573,308 B2
(45) Date of Patent: Feb. 21, 2017

(54) MELTBLOWN METHOD FOR PRODUCING NONWOVEN FABRICS WITH HYGROSCOPIC METASTATIC FEATURE

(71) Applicant: Acelon Chemicals and Fiber Corporation, Changhua County (TW)

(72) Inventors: Wen-Tung Chou, Changhua County (TW); Ming-Yi Lai, Changhua County (TW); Kun-Shan Huang, Tainan (TW); Hsiao-Chi Tsai, Pingtung (TW)

(73) Assignee: ACELON CHEMICALS AND FIBER CORPORATION (TW)

( * ) Notice: Subject to any disclaimer, the term of this patent is extended or adjusted under 35 U.S.C. 154(b) by 168 days.

(21) Appl. No.: 14/644,589

(22) Filed: Mar. 11, 2015

(65) Prior Publication Data

US 2016/0144547 A1 May 26, 2016

(30) Foreign Application Priority Data

Nov. 26, 2014 (TW) .............................. 103141028 A

(51) Int. Cl.
| | |
|---|---|
| *D01F 1/10* | (2006.01) |
| *D04H 3/013* | (2012.01) |
| *D04H 3/105* | (2012.01) |
| *B29C 47/00* | (2006.01) |
| *B29C 47/36* | (2006.01) |

(Continued)

(52) U.S. Cl.
CPC ....... *B29C 47/0021* (2013.01); *B29C 47/0014* (2013.01); *B29C 47/364* (2013.01); *B29C 47/367* (2013.01); *B29C 47/92* (2013.01); *B29C 2947/92704* (2013.01); *B29K 2079/08* (2013.01); *B29L 2007/008* (2013.01); *B29L 2009/00* (2013.01)

(58) Field of Classification Search
None
See application file for complete search history.

(56) References Cited

U.S. PATENT DOCUMENTS 4,704,112 A * 11/1987 Suzuki .............. A61F 13/51305
604/378
6,547,915 B2 * 4/2003 Taylor .................... D04H 1/559
156/160

(Continued)

*Primary Examiner* — Robert B Davis
(74) *Attorney, Agent, or Firm* — Bacon & Thomas, PLLC

(57) ABSTRACT

A meltblown method for producing nonwoven fabrics with hygroscopic metastatic feature. Firstly, fuse prepared bio-polyamide 6,10 into a melt, then extrude, and blow the melt out spinnerets to form natural bio-polyamide 6,10 filaments laid onto a conveyer to form a substrate fibrous web. Secondly, blend and dissolve prepared pulp by putting N-methylmorpholine N-oxide (NMMO) dissolving solvent, and dehydrate it to form dope, then extrude and blow the dope out spinnerets to form natural cellulose filaments laid up over existing fibrous web of bio-polyamide 6,10 on the conveyer so that a fibrous composite of the bio-polyamide 6,10 and natural cellulose in overlaid lamination is formed thereon. Finally, coagulate and regenerate the fibrous composite of the bio-polyamide 6,10 and natural cellulose by means of ejecting mist aerosol of water, and convert it into nonwoven fabric with hygroscopic metastatic feature by orderly applying post treatments of hydro-entangled needle punching, drying, winding-up processes.

18 Claims, 13 Drawing Sheets

(51) Int. Cl.
  *B29C 47/92* (2006.01)
  *B29K 79/00* (2006.01)
  *B29L 7/00* (2006.01)
  *B29L 9/00* (2006.01)

(56) References Cited

U.S. PATENT DOCUMENTS

| | | |
|---|---|---|
| 8,127,575 B2 | 3/2012 | Burrow et al. |
| 8,282,877 B2* | 10/2012 | White .................. D01D 5/0985 156/244.27 |
| 2011/0124258 A1* | 5/2011 | White ...................... D01D 5/14 442/408 |
| 2011/0156299 A1* | 6/2011 | Chou ..................... D04H 3/013 264/103 |

* cited by examiner

MELTBLOWN METHOD FOR PRODUCING NONWOVEN FABRICS WITH HYGROSCOPIC METASTATIC FEATURE

FIELD OF THE PRESENT INVENTION

The present invention relates to a "meltblown method for producing nonwoven fabrics with hygroscopic metastatic feature" belonging to technical field in fabrication of textile fabrics, particularly for one in combination of eco-friendly processes, which neither use any petrochemical product nor create high carbon emission. The nonwoven fabric produced by the present invention is a fibrous composite of the bio-polyamide 6,10 and natural cellulose in overlaid lamination, which is composed of a hydrophobic layer with good water repellence and a water absorbent layer with good water absorption.

BACKGROUND OF THE INVENTION

Normally, nonwoven fabric is better than traditional fabric owing to better material properties and simpler fabrication process, which is finished at one go instead of minute and complicated processes, so that the manufacturing time and cost can be substantially reduced. Nonwoven fabrics are engineered flat, porous sheets that are made directly from molten separate fibers or plastic film with features such as light weight, air permeability, water absorbency, water repellency, resilience, stretch, softness, strength, flame retardancy, washability, cushioning, filtering, bacterial barrier, dust resistance and sterility, which are often combined to create fabrics suited for specific applications while achieving a good balance between product lifespan and cost. Nonwoven fabrics can mimic the appearance, texture and strength of a woven fabric and can be as bulky as the thickest padding by combination with other materials to provide vast product scope with diverse properties for being used in various walks of life such as agriculture, architecture, livelihood, traffic, apparel, home furnishings, health care, engineering, industrial and consumer goods. Especially, the nonwoven fabrics become mainstream material for making clothing and apparel due to intrinsic water absorbency and water repellency thereof. Currently, most marketing materials with water absorbency and water repellency for making clothing and apparel are combination of water absorbent layer and water repellent layer. Wherein, the water absorbent layer is mainly made of polyester fiber nonwoven, Rayon fiber nonwoven, natural cotton and natural linen while the water repellent layer is made of polyethylene fiber. The fabricating methods in the foregoing marketing materials with water absorbency and water repellency for making clothing and apparel are classified into two main categories that chemically laminated total-bonding method and mechanically stacked hem-sewing method. For chemically laminated total-bonding method, nonwovens are typically manufactured by laminating both of the water absorbent layer and water repellent layer together in web form, and then binding them with an adhesive or thermally by applying binder powder, paste, or polymer melt and melting the binder onto the web by heat. The drawback for the chemically laminated total-bonding method is that a layer of glue film is created between the water absorbent layer and water repellent layer so that the water absorbency and air permeability of the nonwoven fabrics are impaired. For mechanically stacked hem-sewing method, nonwovens are typically manufactured by stacking both of the water absorbent layer and water repellent layer together in web form, and then mechanically binding them by interlocking them with serrated stitches over the hem of the web. The drawback for the mechanically stacked hem-sewing method is that a mutual slip is created between the water absorbent layer and water repellent layer so that a breakage from the friction between the water absorbent layer and water repellent layer incurred by the slip is created due to weakening strength of the nonwoven fabrics. However, the wasted nonwoven fabric of chemical synthetic fiber after having been used incurs a malignant impact to the environment because they are indissoluble or biodegradable by natural environment. Moreover, for all aforesaid chemical raw materials from petrochemical material, acquiring cost will gradually increased in follow with gradual decrease in mining quantity of petrochemical material, which is not inexhaustible.

Therefore, how to use suitable natural fiber material with low manufacturing cost to produce nonwoven fabrics of hygroscopic metastatic feature with better air permeability, water absorbency and water repellency without foregoing drawbacks in the existing marketing materials for making clothing and apparel aforesaid, as well as how to originate innovative fabricating methods for producing foregoing expected nonwoven fabrics with reducing malignant impact to the environment becomes an urgent and critical issue.

SUMMARY OF THE INVENTION

Primarily, the object of the present invention is to provide a "meltblown method for producing nonwoven fabrics with hygroscopic metastatic feature" according to following processes: firstly, fuse prepared macromolecule polymer of bio-polyamide 6,10 raw material into a melt of molten substance under high temperature at 280 degree centigrade (280° C.), then extrude the melt out by an extruder with extruding quantity thereof is 300 c.c./min, and affect the melt by continuously injecting high velocity hot air with airflow pressure and speed thereof are 0.50 Mpa and 25 m/s respectively, then forcedly blow the melt out spinnerets to form uniform fine natural bio-polyamide 6,10 filaments, which are laid onto a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 45.1 g/m$^2$ by orderly applying post treatments of hydro-entangled needle punching, drying, winding-up processes.

Secondly, the object of the present invention is to provide a "meltblown method for producing nonwoven fabrics with hygroscopic metastatic feature" to produce a composite nonwoven fabric of the bio-polyamide 6,10 and natural cellulose in overlaid lamination with hygroscopic metastatic feature. The filament composite nonwoven fabric of a water absorbent layer and a hydrophobic layer in form of overlaid lamination, wherein, the water absorbent layer is made of natural cellulose from pulp with high water absorptivity or water absorbency while the hydrophobic layer is made of melt from bio-polyamide 6,10 with high water repellency and low water content so that the water absorbent layer has hygroscopic metastatic capability to absorb the moisture in the hydrophobic layer to keep the surface thereof in dry condition. By increasing the contents of the bio-polyamide 6,10 blown, the effects of the water repellency and hygroscopic metastatic capability from the hydrophobic layer of the bio-polyamide 6,10 is enhanced. Thus, if water with moisture is contained the nonwoven fabric, the water in the hydrophobic layer thereof is immediately dispelled out the surface of the hydrophobic layer while the moisture contained therein is absorbed and kept by the high water absorptivity or water absorbency natural cellulose filaments of the water absorbent layer by capillarity so that not only the wet feeling on the surface of the hydrophobic layer is decreased but also the dry condition of the hydrophobic layer is maintained for the nonwoven fabric.

Thirdly, the object of the present invention is to provide a "meltblown method for producing nonwoven fabrics with hygroscopic metastatic feature" by using bio-polyamide 6,10 and pulp as raw materials, as well as using N-methylmorpholine N-oxide (NMMO) as dissolving solvent. The bio-polyamide 6,10 is produced from inedible agricultural products such as corncob, ricinus and so on, which are not only unfailing in supplying sources but also eco-friendly due to biodegradable nature. Moreover, the dissolving solvent N-methylmorpholine N-oxide (NMMO) used here is non-toxic so that it can be recycled with low consumption rate via filtration, decolor, and condensation under low pressure distillation after having been drained out in water rinse process with rate of recovery up to over 99.5%. Thereby, it also completely complies with the criteria of the environmental protection because it not only can reduce the manufacturing cost but also will not incur any harmful pollution to the environment.

Fourthly, the object of the present invention is to provide a "meltblown method for producing nonwoven fabrics with hygroscopic metastatic feature" in combination of primary meltblown method and subordinate spunbond method to produce a composite nonwoven fabric of the bio-polyamide 6,10 and natural cellulose in overlaid lamination with hygroscopic metastatic feature. Accordingly, the drawback of impaired water absorbency and air permeability for the nonwoven fabrics in the conventional chemical laminated total-bonding method that a layer of glue film is created between the water absorbent layer and water repellent layer is completely avoided.

Finally, the object of the present invention is to provide a "meltblown method for producing nonwoven fabrics with hygroscopic metastatic feature" in combination of primary meltblown method and subordinate melt spinning method to produce a composite nonwoven fabric of the bio-polyamide 6,10 and natural cellulose in overlaid lamination with hygroscopic metastatic feature. Accordingly, the drawback of a breakage from the friction between the water absorbent layer and water repellent layer incurred by mutual slip due to weakening strength of the nonwoven fabrics in the conventional mechanical hem-sewing method is completely avoided.

DETAILED DESCRIPTION OF THE PREFERRED EMBODIMENTS

For further disclosing the fabricating process and effects of the present invention, following preferred exemplary embodiments in associated figures are detailed presented as below.

Figure 1:
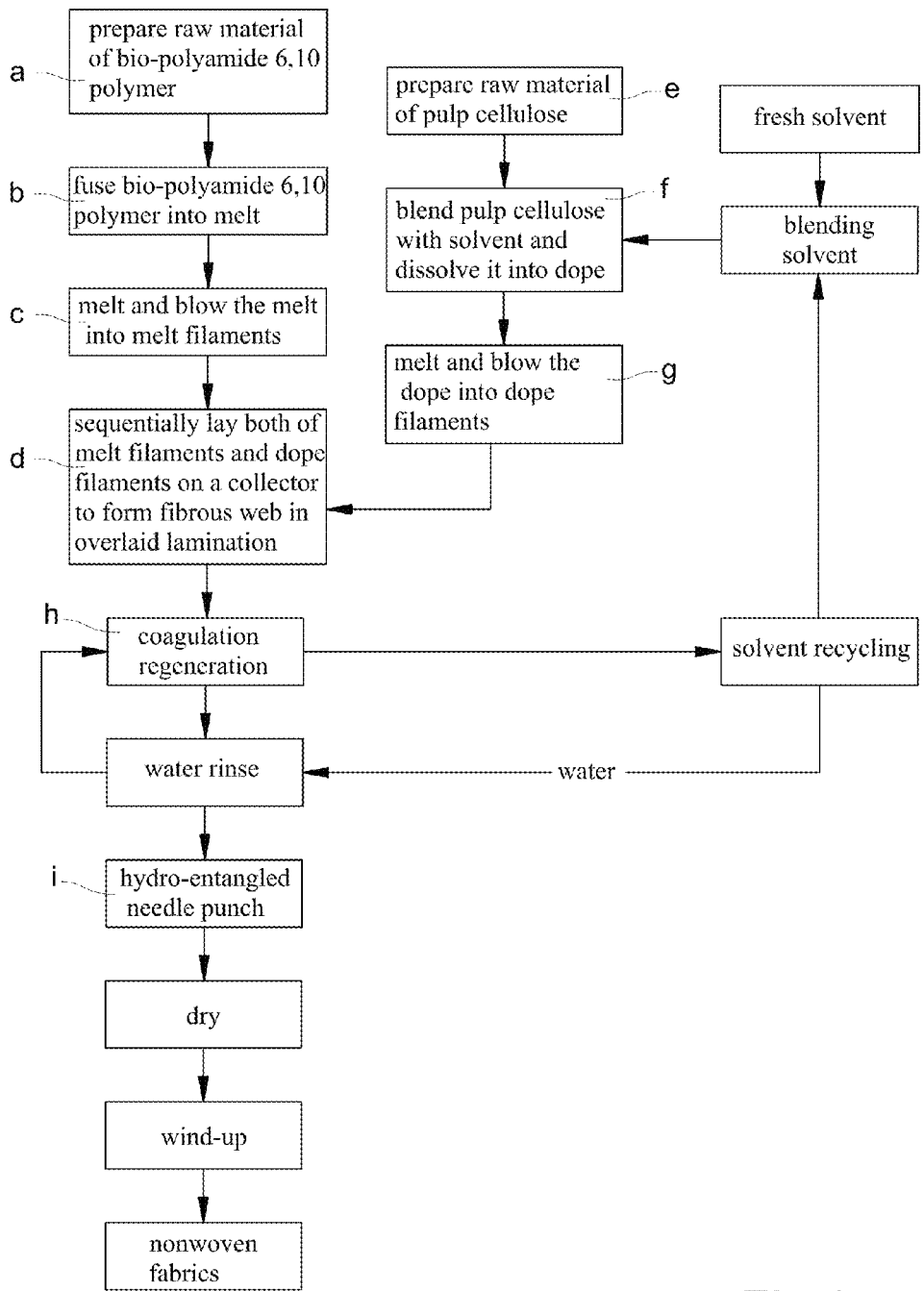
FIG. 1 is a flow chart of block diagram showing the fabricating process for the first embodiment category in meltblown method of the present invention.
Figure 2:
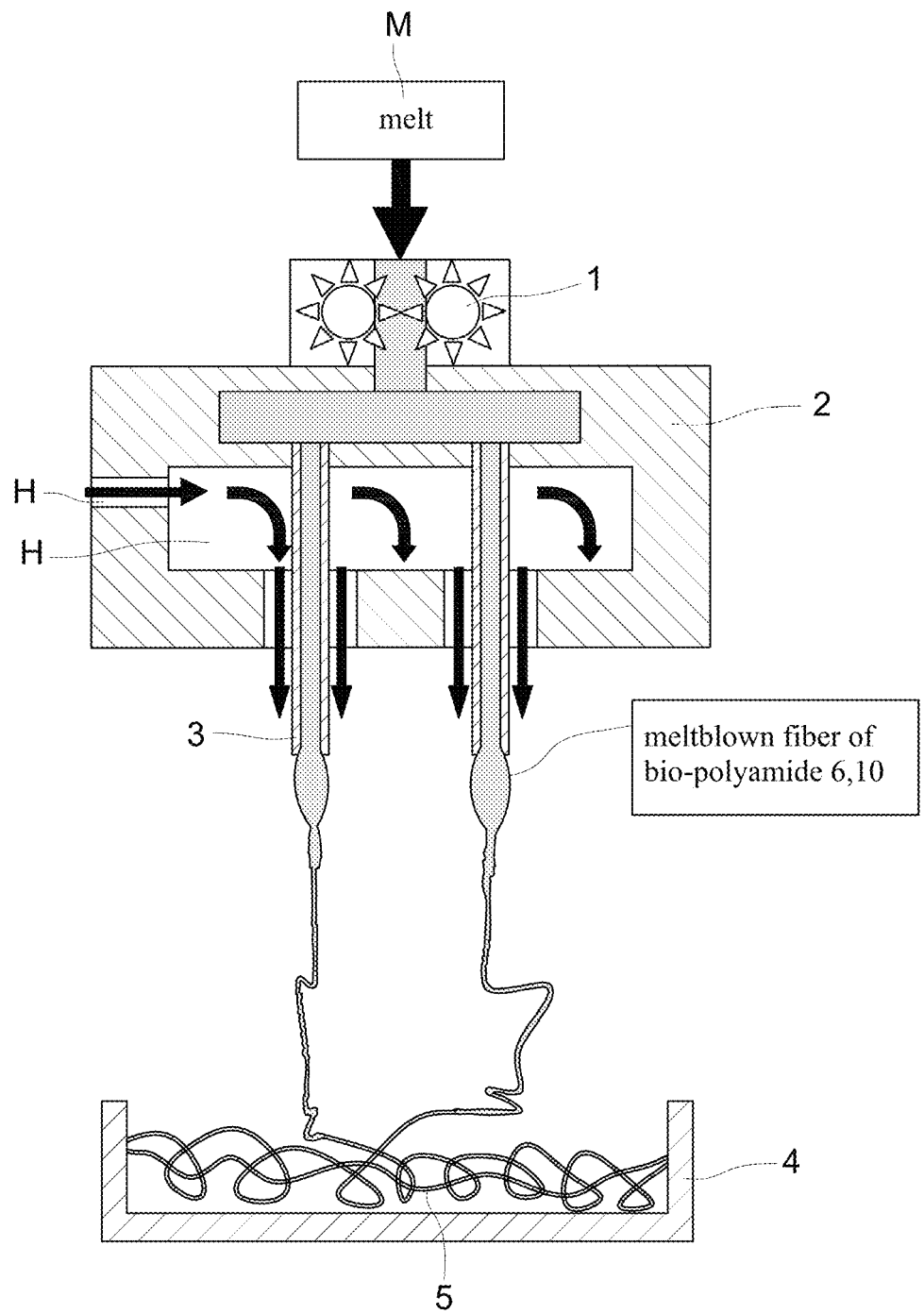
FIG. 2 is an operational schematic view showing a forming process in fibers from bio-polyamide 6,10 for the first embodiment category in meltblown method of the present invention.
Figure 3:
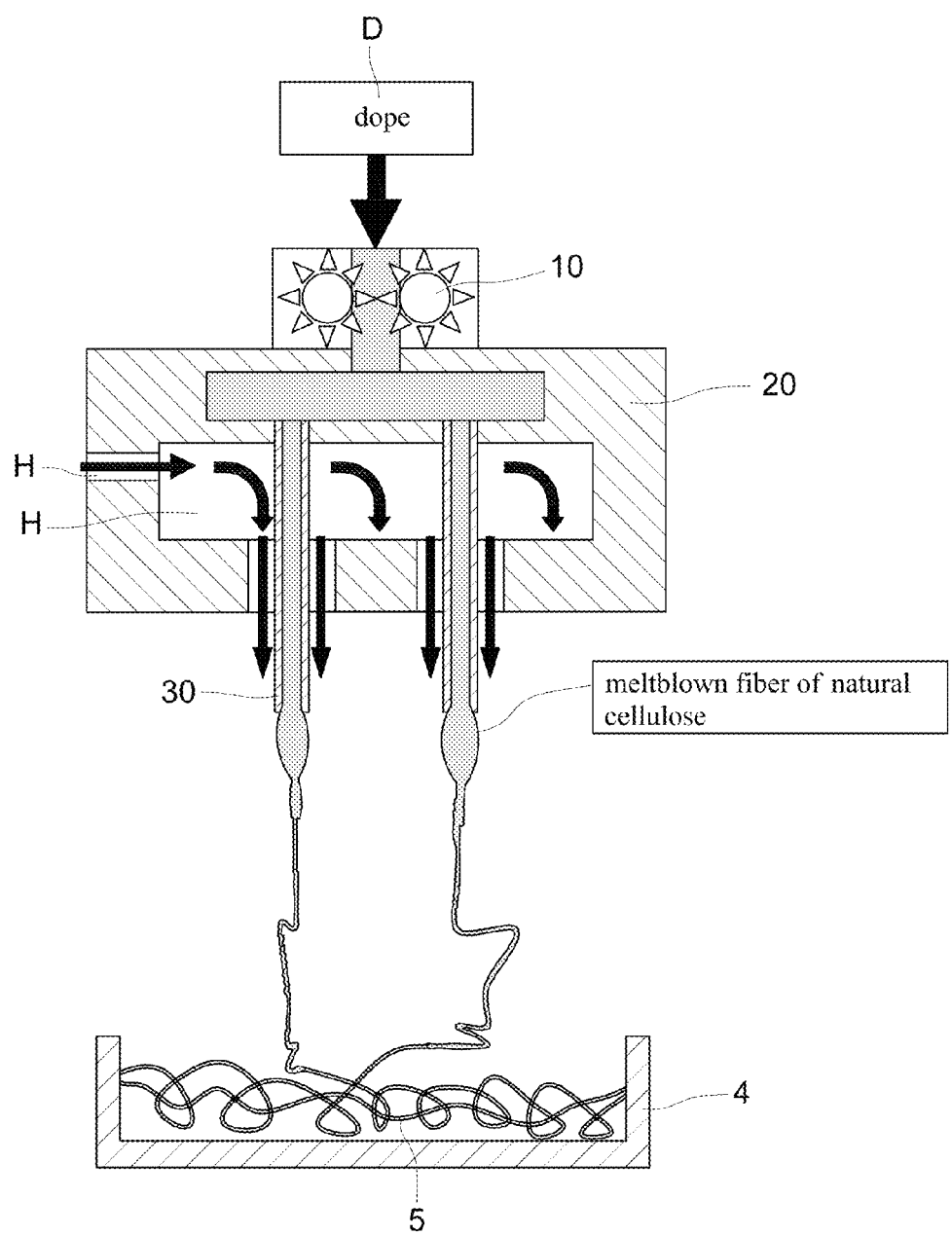
FIG. 3 is an operational schematic view showing a forming process in fibers from natural cellulose for the first embodiment category in the meltblown method of the present invention.
Figure 4:
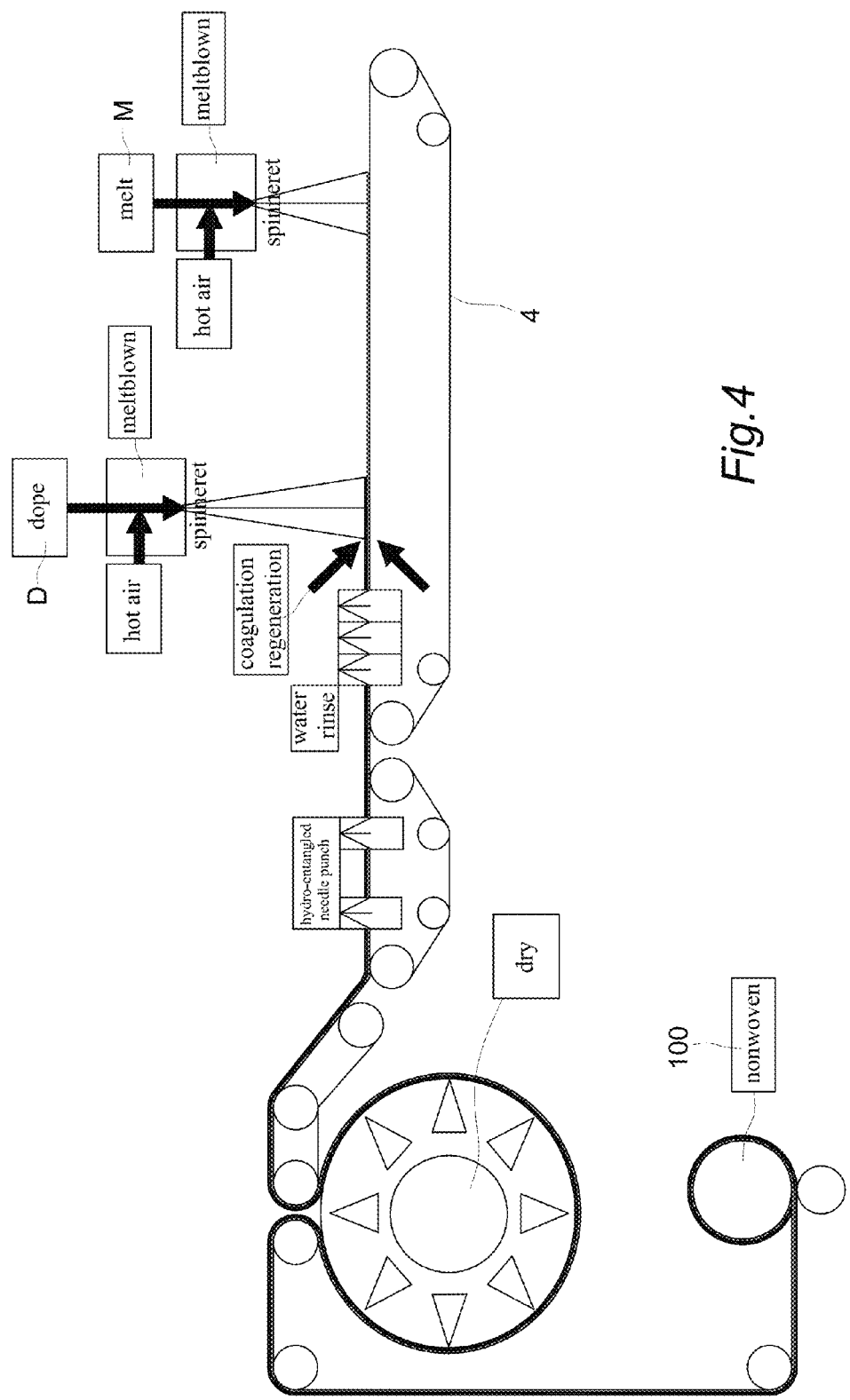
FIG. 4 is a fabrication processing view showing an overall meltblown method for the first embodiment category of the present invention.

FIGS. 1 to 5 show the fabricating process for the first embodiment category in meltblown method of the present invention, wherein the fabricating process of the meltblown method comprises following steps.

a. Prepare macromolecule polymer of bio-polyamide 6,10 as raw material;

b. Fuse the bio-polyamide 6,10 into a melt M of molten substance under high temperature in range of 250-280 degree centigrade (250-280° C.);

c. Via meltblown method, the melt M is firstly fed into and extruded out of an extruder (not shown), next the melt M is fed into a die assembly 2 by means of a gear pump 1, where certain high velocity hot air H is continuously injected in for affecting the melt M by circulation therein and the hot air H is discharged out via surrounding of spinnerets 3, then the melt M is forcedly blown out the spinnerets 3 to form uniform fine natural bio-polyamide 6,10 filaments (as shown in FIG. 2), wherein, the extruding quantity of the extruder is in range of 100-50,000 c.c./min, as well as the ranges for airflow pressure, speed and temperature of the hot air H are 0.01-0.50 Mpa, 2-100 m/s and 250 to 350 degrees centigrade (250° C.-350° C.) respectively;

d. Blow the molten natural bio-polyamide 6,10 filaments onto a conveyer 4 (as shown in FIG. 4), and lay these natural bio-polyamide 6,10 filaments on the conveyer 4 to form a substrate fibrous web 5 with thickness in range of 0.3-2.5 mm (as shown in FIG. 2);

e. Prepare pulp as raw material with content cellulose over 65% and degree of polymerization (DP) in range of 500-1500;

f. By putting N-methylmorpholine N-oxide (NMMO) as dissolving solvent into prepared pulp for high speed blending and dissolving under low temperature in range from 60 to 90 degrees centigrade (60° C.-90° C.) by horizontal dope blending machine by means of cellulose features of high expanding, moistening and dissolving ability as well as high rate of dissolving speed to expedite mutually blending and dissolving effect, then dehydrate it via heating up to temperature in range from 80 to 120 degrees centigrade (80° C.-120° C.) by vacuum film evaporator for 5 minutes to decrease water content thereof down to 5-13% so that a homogenized mucilaginous dope D is formed;

g. Via meltblown method, the dope D is firstly fed into and extruded out of an extruder (not shown), next the dope D is fed into a die assembly 20 by means of a gear pump 10, where certain high velocity hot air H is continuously injected in for affecting the dope D by circulation therein and the hot air H is discharged out via surrounding of spinnerets 30, then the dope D is forcedly blown out the spinnerets 30 to form uniform fine natural cellulose filament bundle, which is laid up over existing fibrous web 5 of bio-polyamide 6,10 on the conveyer 4 in step d so that a fibrous composite web 5 of the bio-polyamide 6,10 and natural cellulose in overlaid lamination is formed thereon as shown in FIG. 3, wherein, the extruding quantity of the extruder is in range of 100-50,000 c.c./min, as well as the ranges for airflow pressure, speed and temperature of the hot air H are 0.01-0.50 Mpa, 2-30 m/s and 120 to 250 degrees centigrade (120° C.-250° C.) respectively;

h. The fibrous composite of the bio-polyamide 6,10 and natural cellulose is coagulated with regeneration by means of ejecting mist aerosol of water, then the dissolving solvent of N-methylmorpholine N-oxide (NMMO) is washed out by water rinsing (as shown in FIGS. 1 and 4); and i. After post treatments of hydro-entangled needle punching, drying, winding-up processes have been orderly applied (as shown in FIGS. 1 and 4), then the fibrous composite web 5 of the bio-polyamide 6,10 and natural cellulose is converted into nonwoven fabric of continuous filament with hygroscopic metastatic feature.

Wherein, the raw material pulp in step e can be categorized into four groups of soft wood pulp, hard wood pulp, cotton pulp, bamboo pulp, or any combination of two pulps selected from foregoing four groups so long as the content cellulose is over 65% and degree of polymerization (DP) is in range of 500-1500.

Moreover, the dissolving solvent N-methylmorpholine N-oxide (NMMO) in foregoing step f is nontoxic with concentration in range of 45%-75% so that it can be recycled with low consumption rate via filtration, decolor, and condensation under low pressure distillation after having been drained out in water rinse process with rate of recovery up to over 99.5% (as shown in FIG. 1). Thereby, it completely complies with the criteria of the environmental protection because it not only can reduce the manufacturing cost but also will not incur any harmful pollution to the environment.

Besides, the ranges for the content of cellulose, viscosity and melting index of the dope D in foregoing step f are 6 wt %-15 wt %, 300-3000 (poise) and 200-1000 respectively.

Figure 5:
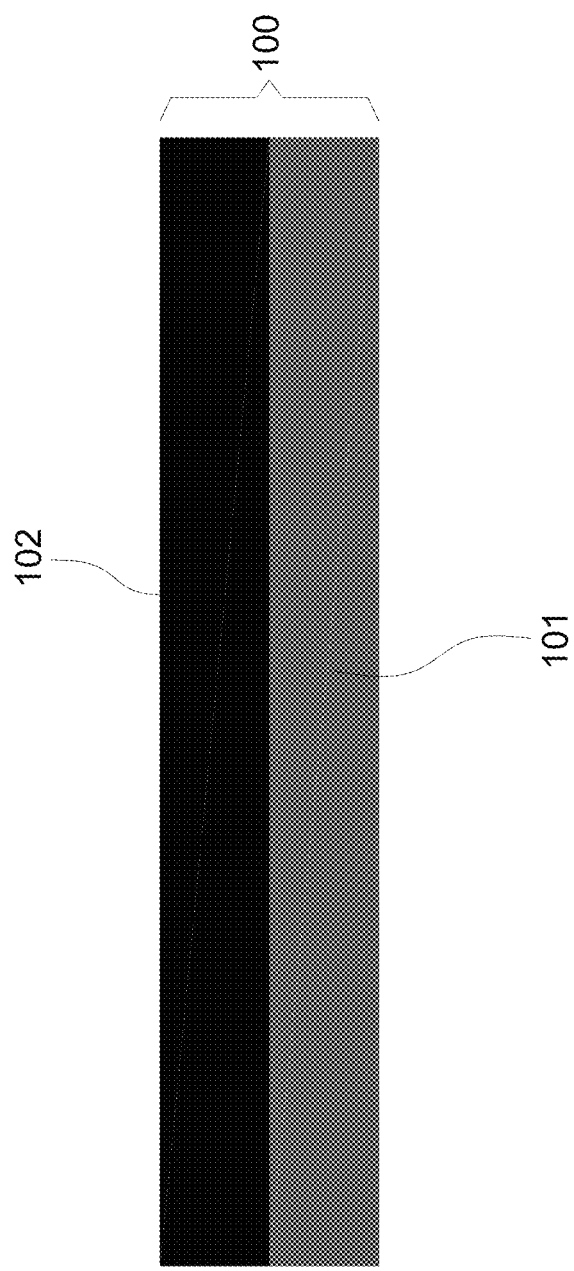
FIG. 5 is a cross sectional view showing a nonwoven fabric with hygroscopic metastatic feature fabricated from the meltblown method for the first embodiment category of the present invention.

FIG. 5 shows a nonwoven fabric 100 with hygroscopic metastatic feature fabricated from the meltblown method for the first embodiment category of the present invention. The nonwoven fabric 100 is a filament composite of a water absorbent layer or hydrophilic layer 102 and a hydrophobic layer 101 in form of overlaid lamination, wherein, the water absorbent layer 102 is made of natural cellulose from pulp with high water absorptivity or water absorbency while the water hydrophobic layer 101 is made of melt from bio-polyamide 6,10 with high water repellency and low water content so that the water absorbent layer 102 has hygroscopic metastatic capability to absorb the moisture in the hydrophobic layer 101 to keep the surface thereof in dry condition. By increasing the contents of the bio-polyamide 6,10 blown in the step c, the effects of the water repellency and hygroscopic metastatic capability from the hydrophobic layer 101 of the bio-polyamide 6,10 is enhanced. Thus, if water with moisture is contained the nonwoven fabric 100, the water in the hydrophobic layer 101 thereof is immediately dispelled out the surface of the hydrophobic layer 101 while the moisture contained therein is absorbed and kept by the high water absorptivity or water absorbency natural cellulose filaments of the water absorbent layer 102 so that not only the wet feeling on the surface of the hydrophobic layer 101 is decreased but also the dry condition of the hydrophobic layer 101 is maintained for the nonwoven fabric 100. Therefore, various nonwoven fabrics 100 with different degrees of hygroscopic metastatic capability can be produced by the meltblown method of the present invention.

In order to prove the features and practical effects for the first embodiment category of the present invention, several exemplary embodiments and comparative experiments covering key parameters have been performed, which are detailed described below with genuine testing data.

Exemplary Embodiment 1

Firstly, fuse prepared macromolecule polymer of bio-polyamide 6,10 raw material into a melt of molten substance under high temperature at 280 degree centigrade (280° C.), then extrude the melt out by an extruder with extruding quantity thereof is 300 c.c./min, and affect the melt by continuously injecting high velocity hot air with airflow pressure and speed thereof are 0.5 Mpa and 25 m/s respectively, then forcedly blow the melt out spinnerets to form uniform fine natural bio-polyamide 6,10 filaments, which are laid onto a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 45.1 g/m² by orderly applying post treatments of hydro-entangled needle punching, drying, winding-up processes. Besides, all related processing parameters aforesaid are summed up and tabulated into following Table-1 as shown.

Exemplary Embodiment 2

Firstly, fuse prepared macromolecule polymer of bio-polyamide 6,10 raw material into a melt of molten substance under high temperature at 280 degree centigrade (280° C.), then extrude the melt out by an extruder with extruding quantity thereof is 250 c.c./min, and affect the melt by continuously injecting high velocity hot air with airflow pressure and speed thereof are 0.5 Mpa and 25 m/s respectively, then forcedly blow the melt out spinnerets to form uniform fine natural bio-polyamide 6,10 filaments, which are laid onto a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 42.2 g/m² by orderly applying post treatments of hydro-entangled needle punching, drying, winding-up processes. Besides, all related processing parameters aforesaid are summed up and tabulated into following Table-1 as shown.

Exemplary Embodiment 3

Firstly, fuse prepared macromolecule polymer of bio-polyamide 6,10 raw material into a melt of molten substance under high temperature at 280 degree centigrade (280° C.), then extrude the melt out by an extruder with extruding quantity thereof is 225 c.c./min, and affect the melt by continuously injecting high velocity hot air with airflow pressure and speed thereof are 0.5 Mpa and 25 m/s respectively, then forcedly blow the melt out spinnerets to form uniform fine natural bio-polyamide 6,10 filaments, which are laid onto a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 40.1 g/m² by orderly applying post treatments of hydro-entangled needle punching, drying, winding-up processes. Besides, all related processing parameters aforesaid are summed up and tabulated into following Table-1 as shown.

Exemplary Embodiment 4

Firstly, fuse prepared macromolecule polymer of bio-polyamide 6,10 raw material into a melt of molten substance under high temperature at 280 degree centigrade (280° C.), then extrude the melt out by an extruder with extruding quantity thereof is 300 c.c./min, and affect the melt by continuously injecting high velocity hot air with airflow pressure and speed thereof are 0.5 Mpa and 25 m/s respectively, then forcedly blow the melt out spinnerets to form uniform fine natural bio-polyamide 6,10 filaments, which are laid onto a conveyer to form a substrate fibrous web; next, blend and dissolve prepared pulp in degree of polymerization 750 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 300 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 39.9 g/m² by orderly applying post treatments of hydro-entangled needle punching, drying, winding-up processes. Besides, all related processing parameters aforesaid are summed up and tabulated into following Table-1 as shown.

TABLE 1

Setting Table for Parameters of Process

| | EE 1 | | EE 2 | | EE 3 | | EE 4 | |
|---|---|---|---|---|---|---|---|---|
| | BP | PC | BP | PC | BP | PC | BP | PC |
| DP | — | 500 | — | 500 | — | 500 | — | 750 |
| EQE (c.c./min) | 300 | 375 | 250 | 375 | 225 | 375 | 300 | 300 |
| HT (° C.) | 280 | 120 | 280 | 120 | 280 | 120 | 280 | 120 |
| AFP (Mpa) | 0.5 | 0.3 | 0.5 | 0.3 | 0.5 | 0.3 | 0.5 | 0.3 |
| AFV (m/s) | 25 | 25 | 25 | 25 | 25 | 25 | 25 | 25 |
| BW (g/m$^2$) | 45.1 | | 42.2 | | 40.1 | | 39.9 | |

EE = Exemplary Embodiment:------:(1st embodiment category)

Notation
BP denotes to bio-polyamide 6,10
PC denotes to pulp cellulose
DP denotes to degree of polymerization
EQE denotes to extruding quantity of extruder
HT denotes to heating temperature
AFP denotes to airflow pressure
AFV denotes to airflow velocity
BW denotes to basis weight of nonwoven For purpose of comparison with foregoing exemplary embodiments, traditional polypropylene (PP), pure cellulose and composite of polypropylene (PP) with cellulose as well as composite of polyester with cellulose are used as raw materials to produce nonwoven in comparative experiments as below.

Comparative Experiment 1

Firstly, fuse prepared polypropylene (PP) raw material into a melt of molten substance under high temperature at 230 degree centigrade (230° C.), then extrude the melt out by an extruder with extruding quantity thereof is 600 c.c./min, and affect the melt by continuously injecting high velocity hot air with airflow pressure and speed thereof are 0.6 Mpa and 30 m/s respectively, then forcedly blow the melt out spinnerets to form uniform fine polypropylene (PP) filaments, then coagulate and regenerate the polypropylene (PP) filaments by means of ejecting mist aerosol of water, and convert it into simple nonwoven fabric of continuous filament with basis weight of 39.7 g/m$^2$ by orderly applying post treatments of hydro-entangled needle punching, drying, winding-up processes. Besides, all related processing parameters aforesaid are summed up and tabulated into following Table-2 as shown.

Comparative Experiment 2

Firstly, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 600 c.c./min, and affect the dope by continuously injecting high velocity hot air with airflow pressure and speed thereof are 0.5 Mpa and 25 m/sec respectively, then forcedly blow the dope out spinnerets to form uniform fine natural cellulose filament bundle, then coagulate and regenerate the cellulose filaments by means of ejecting mist aerosol of water, and convert it into simple nonwoven fabric of continuous filament with basis weight of 41.3 g/m$^2$ by orderly applying post treatments of hydro-entangled needle punching, drying, winding-up processes. Besides, all related processing parameters aforesaid are summed up and tabulated into following Table-2 as shown.

Comparative Experiment 3

Firstly, fuse prepared polypropylene (PP) raw material into a melt of molten substance under high temperature at 230 degree centigrade (230° C.), then extrude the melt out by an extruder with extruding quantity thereof is 300 c.c./min, and affect the melt by continuously injecting high velocity hot air with airflow pressure and speed thereof are 0.6 Mpa and 30 m/s respectively, then forcedly blow the melt out spinnerets to form uniform fine polypropylene (PP) filaments, which are laid onto a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 300 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of polypropylene (PP) on the conveyer so that a fibrous composite of the polypropylene (PP) and natural cellulose in overlaid lamination is formed thereon; and finally, coagulate and regenerate the fibrous composite of the polypropylene (PP) and natural cellulose by means of ejecting mist aerosol of water, and convert it into composite nonwoven fabric of continuous filament with basis weight of 40.3 g/m$^2$ by orderly applying post treatments of hydro-entangled needle punching, drying, winding-up processes. Besides, all related processing parameters aforesaid are summed up and tabulated into following Table-2 as shown.

Comparative Experiment 4

Firstly, fuse prepared polyester raw material into a melt of molten substance under high temperature at 290 degree centigrade (290° C.), then extrude the melt out by an extruder with extruding quantity thereof is 300 c.c./min, and affect the melt by continuously injecting high velocity hot air with airflow pressure and speed thereof are 0.6 Mpa and 30 m/s respectively, then forcedly blow the melt out spinnerets to form uniform fine polyester filaments, which are laid onto a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 300 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of polyester on the conveyer so that a fibrous composite of the polyester and natural cellulose in overlaid lamination is formed thereon; and finally, coagulate and regenerate the fibrous composite of the polyester and natural cellulose by means of ejecting mist aerosol of water, and convert it into composite nonwoven fabric of continuous filament with basis weight of 39.7 g/m² by orderly applying post treatments of hydro-entangled needle punching, drying, winding-up processes. Besides, all related processing parameters aforesaid are summed up and tabulated into following Table-2 as shown.

TABLE 2

Setting Table for Parameters of Process

| | CE = Comparative Experiment | | | | | |
|---|---|---|---|---|---|---|
| | CE 1 | CE 2 | CE 3 | | CE 4 | |
| | PP | PC | PP | PC | PET | PC |
| DP | — | 500 | — | 500 | — | 500 |
| EQE (c.c./min) | 600 | 600 | 300 | 300 | 300 | 300 |
| HT (° C.) | 230 | 120 | 230 | 120 | 290 | 120 |
| AFP (Mpa) | 0.6 | 0.5 | 0.6 | 0.3 | 0.6 | 0.3 |
| AFV (m/s) | 30 | 25 | 30 | 25 | 30 | 25 |
| BW (g/m²) | 39.7 | | 41.3 | | 40.3 | 39.7 |

Notation
PP denotes to polypropylene
PC denotes to pulp cellulose
PET denotes to polyester
DP denotes to degree of polymerization
EQE denotes to extruding quantity of extruder
HT denotes to heating temperature
AFP denotes to airflow pressure
AFV denotes to airflow velocity
BW denotes to basis weight of nonwoven In order to practically compare detailed properties of foregoing nonwoven fabrics produced by exemplary embodiments and comparative experiments, the tests of the strength in Mechanical Direction (MD), strength in Cross Direction (CD), rate of water absorptivity (%) and bending resistance of flexibility (mm) as well as the contact angle of fiber surface (degree), back infiltration of fiber surface (g) and time of water absorption (second) of the hygroscopic metastatic capability are respectively performed as below.

Tests of the Strength in Mechanical Direction (MD) and Cross Direction (CD):

By criteria of CNS 5610 (Standard Number 5610 of Chinese National Standard), the strength tests for nonwoven samples are performed with following procedure.

1. Specimen Preparation:

Respectively obtain 10 pieces of specimens for each cross direction (CD) and mechanical direction or machine direction (MD) with specimen length being over 180 mm and specimen width being 2.54 mm.

2. Testing Procedure:

By using universal strength testing machine with pitch for the specimen holding jaws of testing fixture being set 76 mm under crosshead speed for extension test being set 300 mm/min, respectively perform test for each of 10 specimens.

3. Testing Results:

Respective nonwoven strengths in Mechanical Direction (MD) and Cross Direction (CD) for samples in exemplary embodiments 1-4 are listed in following TABLE-3 while respective nonwoven strengths in Mechanical Direction (MD) and Cross Direction (CD) for samples in comparative experiments 1-4 are listed in following TABLE-4.

Test in the Rate of Water Absorptivity (%):

By criteria of CNS 5612 (Standard Number 5612 of Chinese National Standard), the tests in the rate of water absorptivity (%) for nonwoven samples are performed with following procedure.

1. Specimen Preparation:

Respectively obtain 5 longitudinal pieces of specimens with specimen width being 76 mm, specimen weight being 5.0±0.1 g and specimen length being determined in accordance with the specimen weight.

2. Testing Procedure:

Firstly, put each specimen in a holding basket, and then dunk the holding basket with specimens in water in totally immersion manner for 10 seconds; secondly, lift the holding basket with specimens out of the water to drip water for 10 seconds; and finally, put the holding basket with specimens into a measuring glass of known weight to measure overall gross weight with 0.1 g precision.

3. Testing Results:

The rate of water absorptivity for specimen is calculated by following formula:

$$\text{Rate of water absorptivity (\%): } RA_W(\%) = \{[W_A(g) - W_D(g)]/W_D(g)\} \times 100$$

Where, $RA_W$ denotes to rate of water absorptivity for each specimen;

$W_D$ denotes to specimen dry weight before dunking in water; and $W_A$ denotes to specimen wet weight after dunking in water.

Respective nonwoven rates of water absorptivity for samples in exemplary embodiments 1-4 are listed in following TABLE-3 while respective nonwoven rates of water absorptivity for samples in comparative experiments 1-4 are listed in following TABLE-4.

Test in the Bending Resistance of Flexibility (mm):

By criteria of the "Cantilever Test" in CNS 12915 (Standard Number 12915 of Chinese National Standard), the tests in the bending resistance of flexibility (mm) for nonwoven samples are performed with following way. Normally, the stiffness of the fabric is determined by the hand-feeling and draping feature while the bending resistance of flexibility is measured by a flexometer with testing value denoting in mm unit. The bending resistance of the fabric is inclined to stiff if testing value is large while the bending resistance of the fabric is inclined to flexible if testing value is small.

Respective nonwoven bending resistance of flexibility for samples in exemplary embodiments 1-4 are listed in following TABLE-3 while respective nonwoven bending resistance of flexibility for samples in comparative experiments 1-4 are listed in following TABLE-4.

For test of the hygroscopic metastatic capability, it basically includes three aspects of the contact angle of fiber surface (degree), back infiltration of fiber surface (g) and time of water absorption (second). Here, the bio-polyamide 6,10 is adopted as testing sample of the exemplary embodiments 1-4 for performing the tests in the contact angle of fiber surface (degree), back infiltration of fiber surface (g) and time of water absorption (second).

Test in the Contact Angle of Fiber Surface (Degree):

The contact angle ($\theta$) is the angle, conventionally measured through the liquid, where a liquid/vapor interface meets a solid surface. The contact angle ($\theta$) is the angle at which the liquid-vapor interface meets the solid-liquid interface. The contact angle ($\theta$) quantifies the wettability of a solid surface by a liquid via the Young equation. Wetting is the ability of a liquid to maintain contact with a solid surface, resulting from intermolecular interactions when the two are brought together. The contact angle is determined by the result between adhesive forces and cohesive forces. The degree of wetting (wettability) is determined by a force balance between adhesive forces and cohesive forces. Adhesive forces between a liquid and solid cause a liquid drop to spread across the surface. Cohesive forces within the liquid cause the drop to ball up and avoid contact with the surface. As the tendency of a drop to spread out over a flat solid surface increases, the contact angle ($\theta$) decreases. Thus, the contact angle ($\theta$) provides an inverse measure of wettability. If a contact angle ($\theta$) less than 90° (low contact angle ($\theta$)) usually indicates that wetting of the surface is very favorable, and the fluid will spread over a large area of the surface. If a contact angle ($\theta$) greater than 90° (high contact angle ($\theta$)) generally means that wetting of the surface is unfavorable, so the fluid will minimize contact with the surface and form a compact liquid droplet. For water, a wettable surface may also be termed hydrophilic and a non-wettable surface hydrophobic. Super-hydrophobic surface has contact angle ($\theta$) greater than 150°, showing almost no contact between the liquid drop and the surface.

Respective nonwoven contact angle of the hydrophobic layer 101 fiber surface of in the overlaid lamination filament composite of nonwoven fabric 100 for testing samples of the bio-polyamide 6,10 in exemplary embodiments 1-4 are listed in following TABLE-3 while respective nonwoven contact angle of the hydrophobic layer 101 fiber surface of in the overlaid lamination filament composite of nonwoven fabric 100 for testing samples of the bio-polyamide 6,10 in comparative experiments 1-4 are listed in following TABLE-4.

Test in the Back Infiltration of Fiber Surface (g):

The test in the back infiltration of fiber surface is performed as below.

Firstly, let the testing sample fully absorb water; next, put the dry filter paper over the testing sample in absorbed water; and finally, measure quantity value of absorbed water by the dry filter paper, and denote it in gram unit;

The back infiltration of fiber surface means low rate of water absorptivity inclined to hydrophobic feature if testing quantity value of absorbed water is large while the back infiltration of fiber surface means high rate of water absorptivity inclined to hydrophilic feature if testing quantity value of absorbed water is small.

Respective nonwoven back infiltration of the hydrophobic layer 101 fiber surface of in the overlaid lamination filament composite of nonwoven fabric 100 for testing samples of the bio-polyamide 6,10 in exemplary embodiments 1-4 are listed in following TABLE-3 while respective nonwoven back infiltration of the hydrophobic layer 101 fiber surface of in the overlaid lamination filament composite of nonwoven fabric 100 for testing samples of the bio-polyamide 6,10 in comparative experiments 1-4 are listed in following TABLE-4.

Test in the Time of Water Absorption (Second):

In order to have better contacting feeling of refreshed dry comfort, nonwoven fabric is required to possess rapidity quality in water removal capability instead of keeping wet adhesive on the skin in wearing. Accordingly, by test the liquid moisture management properties of nonwoven fabric, the rapidity quality in water removal capability is indirectly obtained.

The tests in the time of water absorption (second) for nonwoven samples are performed with following way by criteria of the "liquid moisture management properties of textile fabrics" in AATCC 195-2011 (Standard Number 195-2011 in American Association of Textile Chemists and Colorists). Firstly, horizontally sandwich the testing sample between parallel electrically current sensors of upper plate and lower plate, each of which is composed of seven metal probe-pairs corresponding to each other respectively; next, drip water on the upper surface of the testing sample to let the water horizontally spread over the upper surface thereof and let the water vertically permeate into up to lower surface of the testing sample, wherein the upper surface thereof is supposed to contact human skin during wearing (called conduction layer) while the lower surface thereof is supposed to face outwardly during wearing (called absorbent layer), meanwhile respective resistance of each metal probe-pair in the parallel electrically current sensors will vary during this process; and finally, by calculating and converting respective resistance of each metal probe-pair in the parallel electrically current sensors, the capability of moisture absorptivity can be indirectly obtained by evaluating the time of water absorption of fiber surface.

The testing result for time of water absorption of fiber surface means good rapidity quality in water removal capability inclined to have better capability of moisture absorptivity if testing value (second) is small while testing result for time of water absorption of fiber surface means bad rapidity quality in water removal capability inclined to have worse capability of moisture absorptivity if testing value (second) is large.

Respective nonwoven time of water absorption of the hydrophobic layer 101 fiber surface of in the overlaid lamination filament composite of nonwoven fabric 100 for testing samples of the bio-polyamide 6,10 in exemplary embodiments 1-4 are listed in following TABLE-3 while respective nonwoven time of water absorption of the hydrophobic layer 101 fiber surface of in the overlaid lamination filament composite of nonwoven fabric 100 for testing samples of the bio-polyamide 6,10 in comparative experiments 1-4 are listed in following TABLE-4.

TABLE 3

Trait Table of Nonwoven Fabrics

|  | EE = Exemplary Embodiment:------:(1st Embodiment category) | | | |
| --- | --- | --- | --- | --- |
|  | EE 1 | EE 2 | EE 3 | EE 4 |
| BW (g/m$^2$) | 45.1 | 42.2 | 40.1 | 39.9 |
| TK (mm) | 0.35 | 0.32 | 0.3 | 0.29 |

TABLE 3-continued

Trait Table of Nonwoven Fabrics

| | EE = Exemplary Embodiment:------:(1st Embodiment category) | | | |
|---|---|---|---|---|
| | EE 1 | EE 2 | EE 3 | EE 4 |
| AFD (um) | 2.8 | 2.9 | 2.7 | 3 |
| SMD (Kgf) | 14.5 | 13.8 | 12.2 | 12.1 |
| SCD (Kgf) | 6.9 | 5.8 | 5.6 | 5.7 |
| RWA (%) | 221.9 | 213.5 | 210.6 | 233.1 |
| BRF (cm) | 40 | 38 | 30 | 34 |
| CAFS (degree) | 130 | 126 | 119 | 131 |
| BIFS (g) | 0.3 | 0.4 | 0.7 | 0.3 |
| TWA (second) | 25 | 29 | 30 | 15 |

Notation
BW denotes to basis weight of nonwoven
TK denotes to thickness
AFD denotes to average of fiber diameter
SMD denotes to strength in machine direction (MD)
SCD denotes to strength in cross direction (CD)
RWA denotes to rate of water absorptivity
BRF denotes to bending resistance of flexibility
AVS denotes to airflow velocity stretch
CAFS denotes to contact angle of fiber surface (BP)
BIFS denotes to back infiltration of fiber surface (BP)
TWA denotes to time of water absorption

TABLE 4

Trait Table of Nonwoven Fabrics

| | CE = Comparative Experiment | | | |
|---|---|---|---|---|
| | CE 1 | CE 2 | CE 3 | CE 4 |
| BW (g/m$^2$) | 39.7 | 41.3 | 40.3 | 39.7 |
| TK (mm) | 0.32 | 0.29 | 0.32 | 0.31 |
| AFD (um) | 3.1 | 2.5 | 3.1 | 3 |
| SMD (Kgf) | 12.9 | 11.5 | 12.8 | 12.9 |
| SCD (Kgf) | 5.7 | 5.5 | 5.7 | 5.8 |
| RWA (%) | 80.1 | 220.1 | 205.1 | 209.9 |
| BRF (cm) | 86 | 25 | 64 | 59 |
| CAFS (degree) | 75 | n/a | 85 | 86 |
| BIFS (g) | 7.1 | 3.3 | 1.3 | 1.4 |
| TWA (second) | 45 | 40 | 32 | 33 |

Notation
BW denotes to basis weight of nonwoven
TK denotes to thickness
AFD denotes to average of fiber diameter
SMD denotes to strength in machine direction (MD)
SCD denotes to strength in cross direction (CD)
RWA denotes to rate of water absorptivity
BRF denotes to bending resistance of flexibility
AVS denotes to airflow velocity stretch
CAFS denotes to contact angle of fiber surface (BP)
BIFS denotes to back infiltration of fiber surface (BP)
TWA denotes to time of water absorption Following inferences for the nonwoven fabrics with hygroscopic metastatic feature produced by exemplary embodiments 1-4 in the first embodiment category in melt-blown method of the present invention can be summarized via comparison of individual values for each pair of corresponding item in respective "Trait Table of Nonwoven Fabrics" of Table-3 for exemplary embodiments 1-4 and corresponding Table-4 for comparative experiments 1-4.

Comparison for the Strength in Mechanical Direction (MD) and Cross Direction (CD):

In Table-3 for exemplary embodiments 1-4, the average strength in Mechanical Direction (MD) is about 13.00 Kgf, and the average strength in Cross Direction (CD) is about 6.10 Kgf.

In Table-4 for comparative experiments 1-4, the average strength in Mechanical Direction (MD) is about 12.50 Kgf, and the average strength in Cross Direction (CD) is about 5.70 Kgf.

Therefore, the strengths of the nonwoven fabrics in the exemplary embodiments 1-4 of the present invention are better than those of the nonwoven fabrics in the comparative experiments 1-4.

Comparison for the Bending Resistance of Flexibility (BRF):

In Table-3 for exemplary embodiments 1-4, the average bending resistance of flexibility (BRF) is about 35 cm.

In Table-4 for comparative experiments 1-4, the average bending resistance of flexibility (BRF) is about 55 cm.

Therefore, the bending resistances of flexibility (BRF) for the nonwoven fabrics in the exemplary embodiments 1-4 of the present invention are better than those for the nonwoven fabrics in the comparative experiments 1-4.

Comparison for the Rate of Water Absorptivity (RWA):

In Table-3 for exemplary embodiments 1-4, the average rate of water absorptivity (RWA) is about 220%.

In Table-4 for comparative experiments 1-4, the average rate of water absorptivity (RWA) is about 200%.

Therefore, the rates of water absorptivity (RWA) for the nonwoven fabrics in the exemplary embodiments 1-4 of the present invention are better than those for the nonwoven fabrics in the comparative experiments 1-4.

As previously mentioned, the comparison for the hygroscopic metastatic feature includes three aspects:

Comparison for the contact angle of fiber surface (CAFS):

Comparison for the back infiltration of fiber surface (BIFS):

Comparison for the time of water absorption (TWA):

Each comparison of foregoing three aspects is illustrated as below.

Comparison for the Contact Angle of Fiber Surface (CAFS):

In Table-3 for exemplary embodiments 1-4, the average contact angle of fiber surface (CAFS) is about 126 degree.

In Table-4 for comparative experiments 1-4, the average contact angle of fiber surface (CAFS) is about 82 degree.

Therefore, the contact angles of fiber surface (CAFS) for the nonwoven fabrics in the exemplary embodiments 1-4 of the present invention are better than those for the nonwoven fabrics in the comparative experiments 1-4.

Comparison for the Back Infiltration of Fiber Surface (BIFS):

In Table-3 for exemplary embodiments 1-4, the average back infiltration of fiber surface (BIFS) is about 0.4 gram.

In Table-4 for comparative experiments 1-4, the average back infiltration of fiber surface (BIFS) is about 3.0 gram.

Therefore, the back infiltrations of fiber surface (BIFS) for the nonwoven fabrics in the exemplary embodiments 1-4 of the present invention are better than those for the nonwoven fabrics in the comparative experiments 1-4.

Comparison for the Time of Water Absorption (TWA):

In Table-3 for exemplary embodiments 1-4, the average time of water absorption (TWA) is about 26 second.

In Table-4 for comparative experiments 1-4, the average time of water absorption (TWA) is about 38 second.

Therefore, the times of water absorption (TWA) for the nonwoven fabrics in the exemplary embodiments 1-4 of the present invention are better than those for the nonwoven fabrics in the comparative experiments 1-4.

With three aspect comparisons illustrated above, it is apparent that for the hygroscopic metastatic feature for the nonwoven fabrics in the exemplary embodiments 1-4 of the present invention is better than those for the nonwoven fabrics in the comparative experiments 1-4.

In conclusion of overall comparisons illustrated above, not only the hygroscopic metastatic feature for the nonwoven fabrics produced by the exemplary embodiments 1-4 in the first embodiment category of the present invention is better than that for the nonwoven fabrics in the comparative experiments 1-4, but also the strengths, bending resistance of flexibility (BRF) and rate of water absorptivity (RWA) for the nonwoven fabrics produced by the exemplary embodiments 1-4 in the first embodiment category of the present invention are better than those for the nonwoven fabrics in the comparative experiments 1-4.

Accordingly, the nonwoven fabrics produced by the meltblown method of the present invention indeed have superiority of hygroscopic metastatic feature over conventional nonwoven fabrics. Particularly, the innovative filament composite nonwoven fabric 100 of a water absorbent layer or hydrophilic layer 102 and a hydrophobic layer 101 in form of overlaid lamination, wherein, the water absorbent layer 102 is made of natural cellulose from pulp with high water absorptivity or water absorbency while the hydrophobic layer 101 is made of melt from bio-polyamide 6,10 with high water repellency and low water content so that the water absorbent layer 102 has hygroscopic metastatic capability to absorb the moisture in the hydrophobic layer 101 to keep the surface thereof in dry condition. By increasing the contents of the bio-polyamide 6,10 blown, the effects of the water repellency and hygroscopic metastatic capability from the hydrophobic layer 101 of the bio-polyamide 6,10 is enhanced. Thus, if water with moisture is contained the nonwoven fabric 100, the water in the hydrophobic layer 101 thereof is immediately dispelled out the surface of the hydrophobic layer 101 while the moisture contained therein is absorbed and kept by the high water absorptivity or water absorbency natural cellulose filaments of the water absorbent layer 102 by capillarity so that not only the wet feeling on the surface of the hydrophobic layer 101 is decreased but also the dry condition of the hydrophobic layer 101 is maintained for the nonwoven fabric 100.

Figure 6:
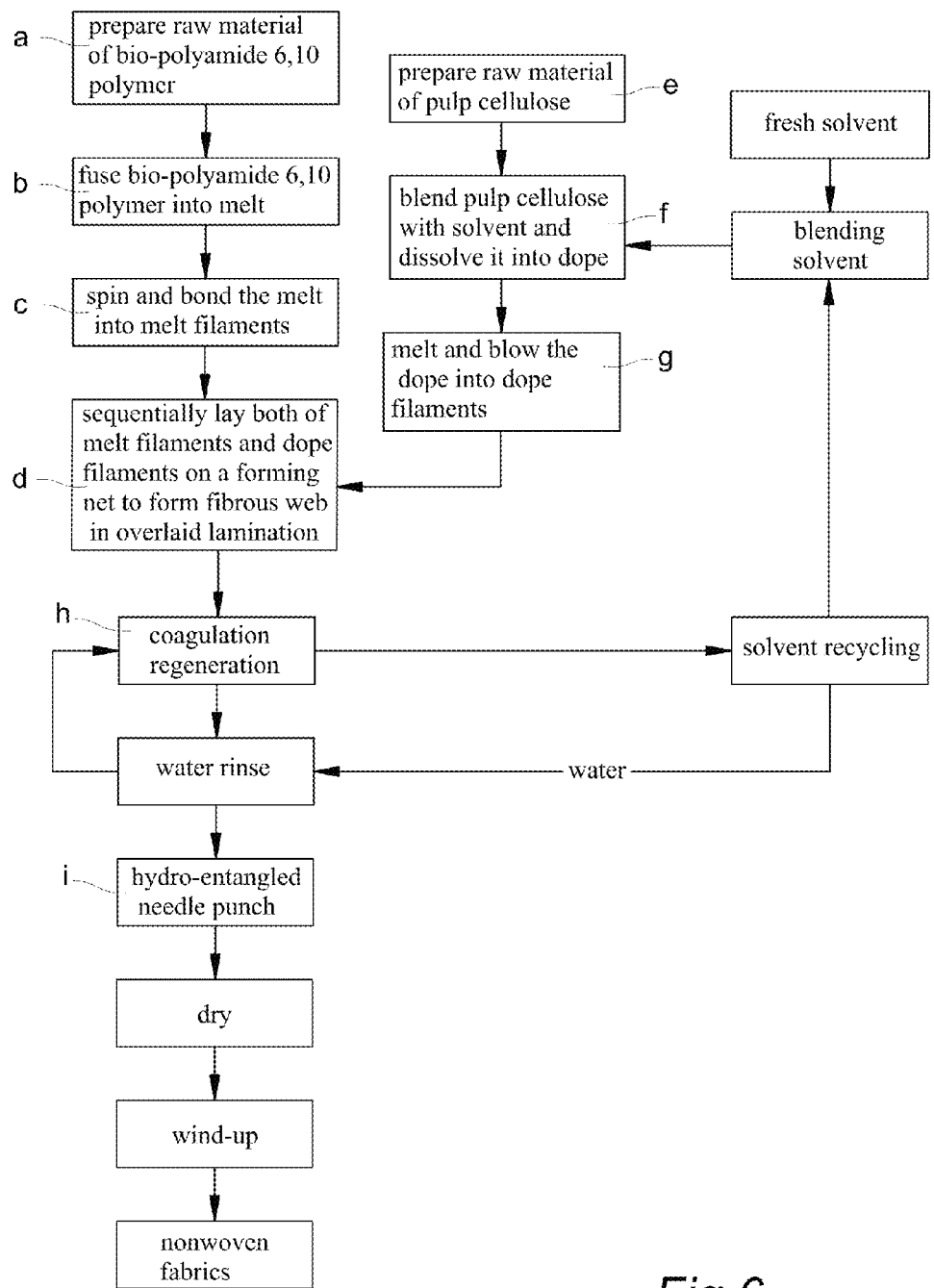
FIG. 6 is another flow chart of block diagram showing the fabricating process for the second embodiment category in meltblown method of the present invention.
Figure 7:
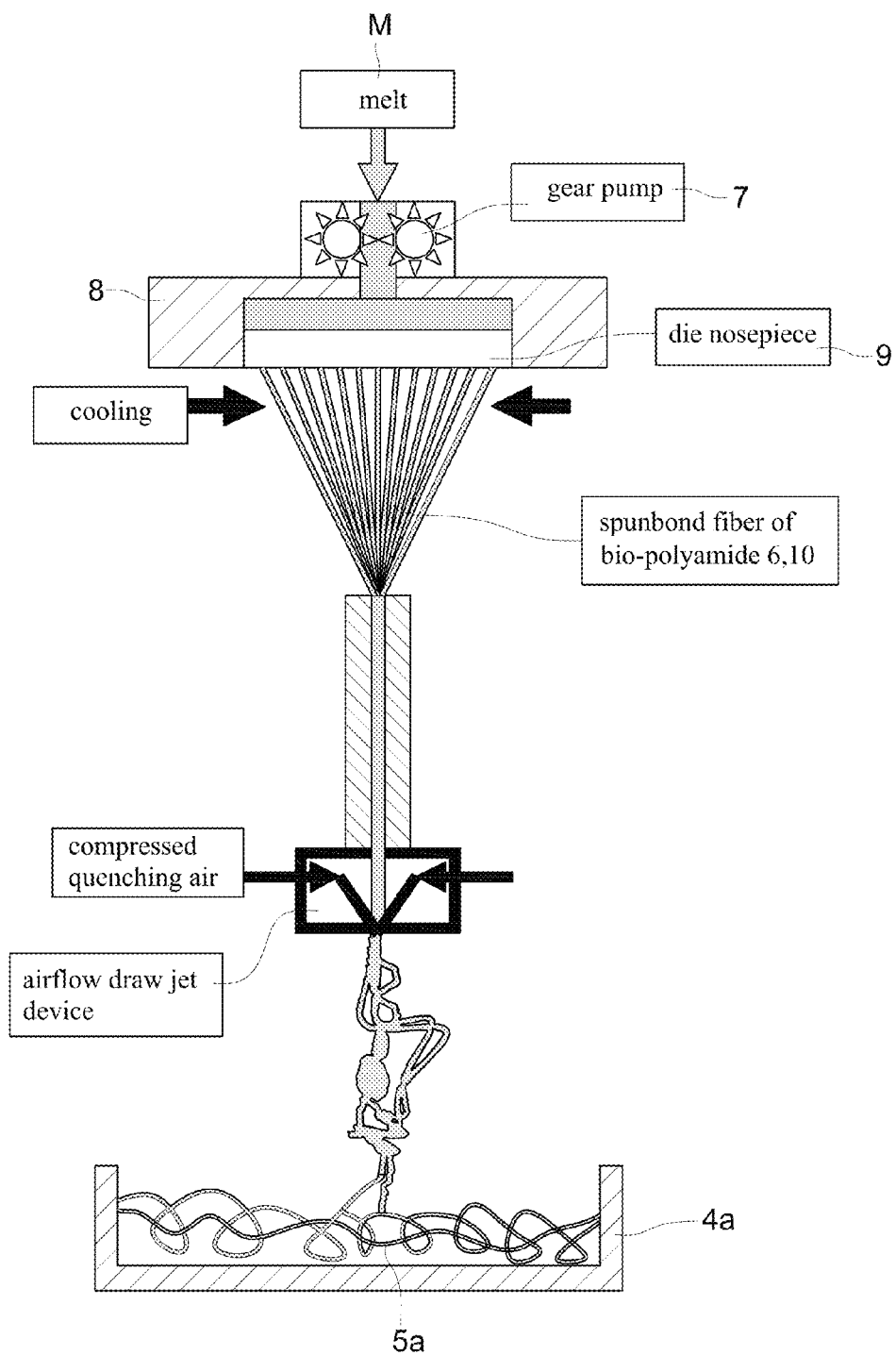
FIG. 7 is another operational schematic view showing a forming process in fibers from bio-polyamide 6,10 for the second embodiment category in spunbond method of the present invention.
Figure 8:
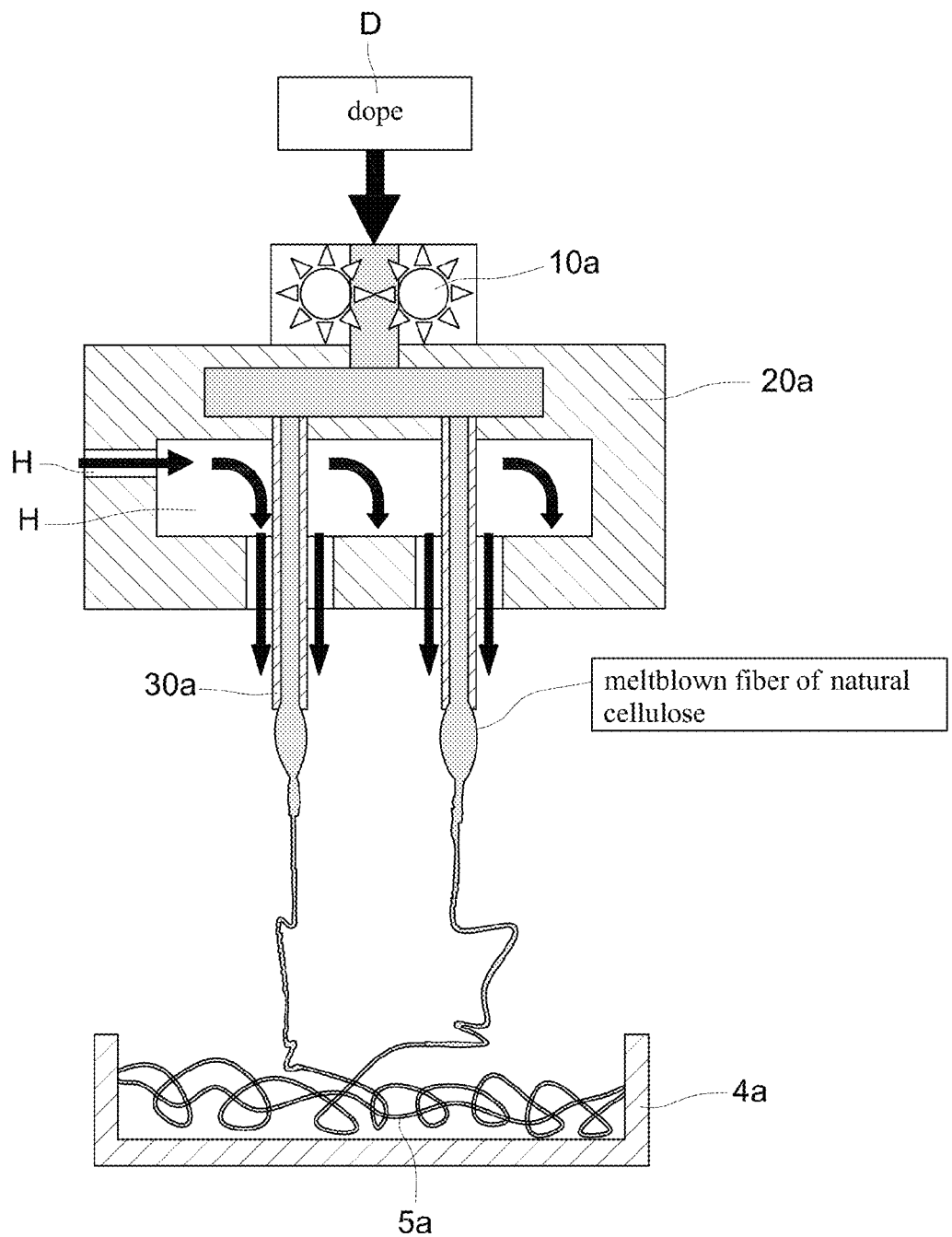
FIG. 8 is another operational schematic view showing a forming process in fibers from natural cellulose for the second embodiment category in the meltblown method of the present invention.
Figure 9:
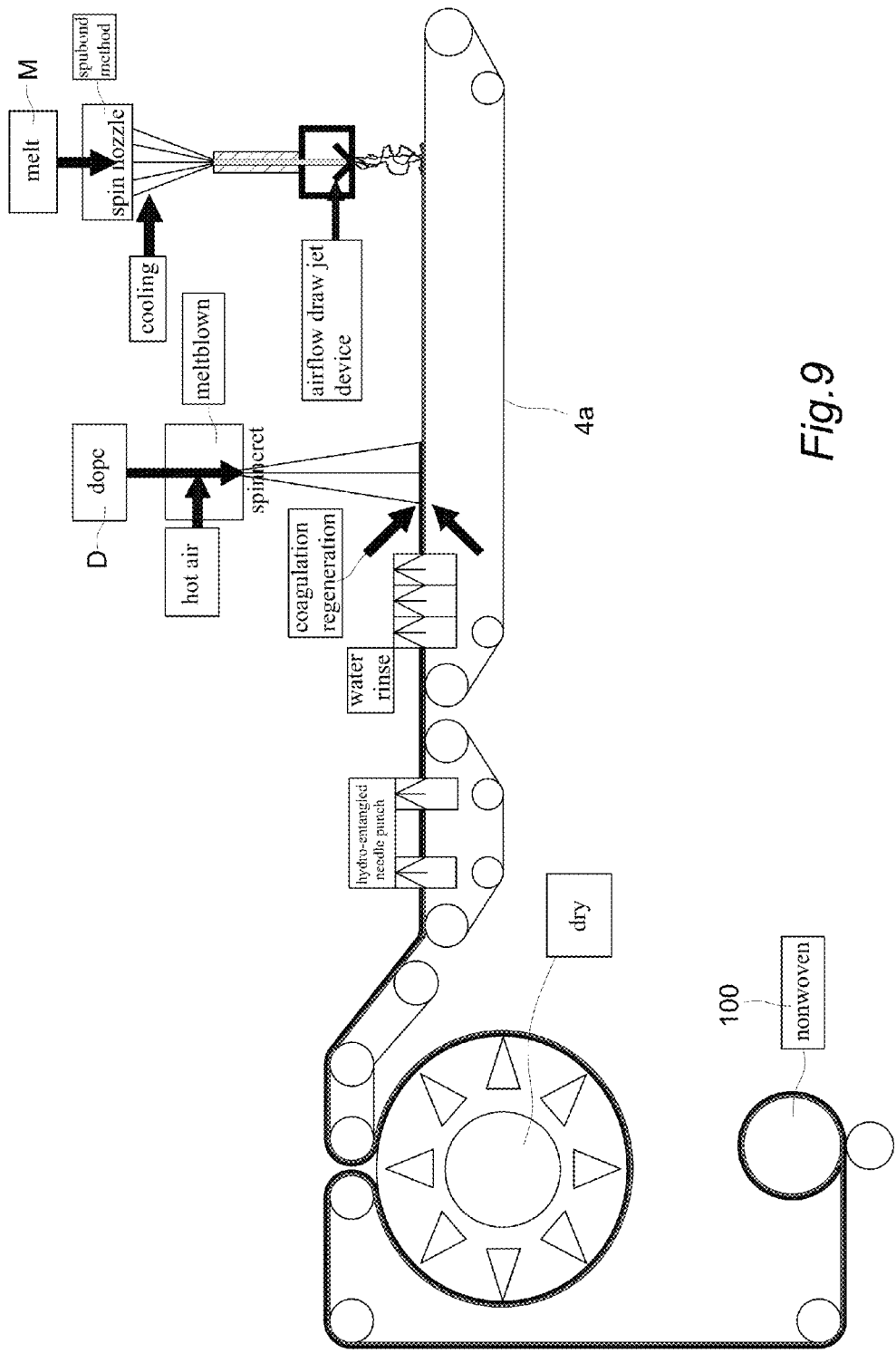
FIG. 9 is another fabrication processing view showing an overall meltblown method for the second embodiment category of the present invention.

FIGS. 6 to 9 show the fabricating process for the second embodiment category in meltblown method of the present invention, wherein the fabricating process of the meltblown method comprises following steps.

a. Prepare macromolecule polymer of bio-polyamide 6,10 as raw material;

b. Fuse the bio-polyamide 6,10 into a melt M of molten substance under high temperature in range of 250-280 degree centigrade (250-280° C.);

c. Via spunbond method, the melt M is firstly fed into and extruded out of an extruder (not shown), next the melt M is fed into a spin-pack 8 and forcedly spun out of spin nozzles 9 by means of a gear pump 7 as shown in FIG. 7, where external compressed quenching air is continuously blown through for cooling and preliminarily drawing the melt M for converting it into natural bio-polyamide 6,10 filaments by means of air gap, wherein, the extruding quantity of the extruder is in range of 100-50,000 c.c./min, as well as the ranges for air gap, temperature and relative humidity of the quenching air are 2-30 cm, 15 to 25 degrees centigrade (15° C.-25° C.) and 60%-99% respectively;

d. Draw the natural bio-polyamide 6,10 filaments by an airflow draw jet device or airflow draw stretcher with drawing velocity in range of 20-3,000 m/min to become uniform fine natural bio-polyamide 6,10 filaments, then bond and lay these natural bio-polyamide 6,10 filaments on a conveyer 4a to form a substrate fibrous web 5a with thickness in range of 0.3-2.5 mm (as shown in FIGS. 7 and 9);

e. Prepare pulp as raw material with content cellulose over 65% and degree of polymerization (DP) in range of 500-1500;

f. By putting N-methylmorpholine N-oxide (NMMO) as dissolving solvent into prepared pulp for high speed blending and dissolving under low temperature in range from 60 to 90 degrees centigrade (60° C.-90° C.) by horizontal dope blending machine by means of cellulose features of high expanding, moistening and dissolving ability as well as high rate of dissolving speed to expedite mutually blending and dissolving effect, then dehydrate it via heating up to temperature in range from 80 to 120 degrees centigrade (80° C.-120° C.) by vacuum film evaporator for 5 minutes to decrease water content thereof down to 5-13% so that a homogenized mucilaginous dope D is formed;

g. Via meltblown method, the dope D is firstly fed into and extruded out of an extruder (not shown), next the dope D is fed into a die assembly 20a by means of a gear pump 10a as shown in FIG. 8, where certain high velocity hot air H is continuously injected in for affecting the dope D by circulation therein and the hot air H is discharged out via surrounding of spinnerets 30a, then the dope D is forcedly blown out the spinnerets 30a to form uniform fine natural cellulose filament bundle, which is laid up over existing fibrous web 5a of bio-polyamide 6,10 on the conveyer 4a in step d so that a fibrous composite web 5a of the bio-polyamide 6,10 and natural cellulose in overlaid lamination is formed thereon (as shown in FIGS. 8 and 9), wherein, the extruding quantity of the extruder is in range of 100-50,000 c.c./min, as well as the ranges for airflow pressure, speed and temperature of the hot air H are 0.01-0.50 Mpa, 2-30 m/s and 120 to 250 degrees centigrade (120° C.-250° C.) respectively;

h. The fibrous composite of the bio-polyamide 6,10 and natural cellulose is coagulated with regeneration by means of ejecting mist aerosol of water, then the dissolving solvent of N-methylmorpholine N-oxide (NMMO) is washed out by water rinsing (as shown in FIGS. 6 and 9); and i. After post treatments of hydro-entangled needle punching, drying, winding-up processes have been orderly applied, then the fibrous composite web 5a of the bio-polyamide 6,10 and natural cellulose is converted into nonwoven fabric of continuous filament with hygroscopic metastatic feature (as shown in FIGS. 6 and 9).

Wherein, the raw material pulp in step e can be categorized into four groups of soft wood pulp, hard wood pulp, cotton pulp, bamboo pulp, or any combination of two pulps selected from foregoing four groups so long as the content cellulose is over 65% and degree of polymerization (DP) is in range of 500-1500.

Moreover, the concentration of the dissolving solvent N-methylmorpholine N-oxide (NMMO) in foregoing step f is in range of 45%-75% while the ranges for the content of cellulose, viscosity and melting index of the dope D in foregoing step f are 6 wt %-15 wt %, 300-3000 (poise) and 200-1000 respectively.

In order to further prove the features and practical effects for the second embodiment category of the present invention, four exemplary embodiments 5-8 covering key parameters have been performed, which are detailed described below with genuine testing data.

Exemplary Embodiment 5

Firstly, fuse prepared macromolecule polymer of bio-polyamide 6,10 raw material into a melt of molten substance under high temperature at 280 degree centigrade (280° C.), via spunbond method, extrude the melt out by an extruder with extruding quantity thereof is 300 c.c./min, and the melt is forcedly spun out of spin nozzles, where external compressed quenching air of 20 degrees centigrade (20° C.) is continuously blown through via an air gap of 10 cm for cooling and preliminarily drawing the melt, then draw the melt to form uniform fine natural bio-polyamide 6,10 filaments by an airflow draw jet device or airflow draw stretcher with drawing velocity of 1,500 m/min, then bond and lay these natural bio-polyamide 6,10 filaments on a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.) then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 44.9 g/m$^2$ by orderly applying post treatments of hydro-entangled needle punching, drying, winding-up processes. Besides, all related processing parameters aforesaid are summed up and tabulated into following Table-5 as shown.

Exemplary Embodiment 6

Firstly, fuse prepared macromolecule polymer of bio-polyamide 6,10 raw material into a melt of molten substance under high temperature at 280 degree centigrade (280° C.), via spunbond method, extrude the melt out by an extruder with extruding quantity thereof is 250 c.c./min, and the melt is forcedly spun out of spin nozzles, where external compressed quenching air of 20 degrees centigrade (20° C.) is continuously blown through via an air gap of 10 cm for cooling and preliminarily drawing the melt, then draw the melt to form uniform fine natural bio-polyamide 6,10 filaments by an airflow draw jet device or airflow draw stretcher with drawing velocity of 1,500 m/min, then bond and lay these natural bio-polyamide 6,10 filaments on a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 42.3 g/m$^2$ by orderly applying post treatments of hydro-entangled needle punching, drying, winding-up processes. Besides, all related processing parameters aforesaid are summed up and tabulated into following Table-5 as shown.

Exemplary Embodiment 7

Firstly, fuse prepared macromolecule polymer of bio-polyamide 6,10 raw material into a melt of molten substance under high temperature at 280 degree centigrade (280° C.), via spunbond method, extrude the melt out by an extruder with extruding quantity thereof is 225 c.c./min, and the melt is forcedly spun out of spin nozzles, where external compressed quenching air of 20 degrees centigrade (20° C.) is continuously blown through via an air gap of 10 cm for cooling and preliminarily drawing the melt, then draw the melt to form uniform fine natural bio-polyamide 6,10 filaments by an airflow draw jet device or airflow draw stretcher with drawing velocity of 1,500 m/min, then bond and lay these natural bio-polyamide 6,10 filaments on a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 40.2 g/m$^2$ by orderly applying post treatments of hydro-entangled needle punching, drying, winding-up processes. Besides, all related processing parameters aforesaid are summed up and tabulated into following Table-5 as shown.

Exemplary Embodiment 8

Firstly, fuse prepared macromolecule polymer of bio-polyamide 6,10 raw material into a melt of molten substance under high temperature at 280 degree centigrade (280° C.), via spunbond method, extrude the melt out by an extruder with extruding quantity thereof is 300 c.c./min, and the melt is forcedly spun out of spin nozzles, where external compressed quenching air of 20 degrees centigrade (20° C.) is continuously blown through via an air gap of 10 cm for cooling and preliminarily drawing the melt, then draw the melt to form uniform fine natural bio-polyamide 6,10 filaments by an airflow draw jet device or airflow draw stretcher with drawing velocity of 1,500 m/min, then bond and lay these natural bio-polyamide 6,10 filaments on a conveyer to form a substrate fibrous web; next, blend and dissolve prepared pulp in degree of polymerization 750 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 300 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 39.9 g/m$^2$ by orderly applying post treatments of hydro-entangled needle punching, drying, winding-up processes. Besides, all related processing parameters aforesaid are summed up and tabulated into following Table-5 as shown.

TABLE 5

Setting Table for Parameters of Process

| | EE = Exemplary Embodiment:------:(2nd embodiment category) | | | | | | |
|---|---|---|---|---|---|---|---|
| | EE 5 | | EE 6 | | EE 7 | | EE 8 | |
| | BP | PC | BP | PC | BP | PC | BP | PC |
| DP | — | 500 | — | 500 | — | 500 | — | 750 |
| EQE (c.c./min) | 300 | 375 | 250 | 375 | 225 | 375 | 300 | 300 |
| HT (° C.) | 280 | 120 | 280 | 120 | 280 | 120 | 280 | 120 |
| AFP (Mpa) | — | 0.3 | — | 0.3 | — | 0.3 | — | 0.3 |
| AFV (m/s) | — | 25 | — | 25 | — | 25 | — | 25 |
| CAG (cm) | 10 | — | 10 | — | 10 | — | 10 | — |
| TQA (° C.) | 20 | — | 20 | — | 20 | — | 20 | — |
| AVS (m/min) | 1500 | — | 1500 | — | 1500 | — | 1500 | — |
| BW (g/m$^2$) | 44.9 | | 42.3 | | 40.2 | | 39.9 | |

Notation
BP denotes to bio-polyamide 6,10
PC denotes to pulp cellulose
DP denotes to degree of polymerization
EQE denotes to extruding quantity of extruder
HT denotes to heating temperature
AFP denotes to airflow pressure
AFV denotes to airflow velocity
CAG denotes to cooling air gap
TQA denotes to temperature of cooling/quenching air
AVS denotes to airflow velocity stretch
BW denotes to basis weight of nonwoven In order to practically compare detailed properties of foregoing nonwoven fabrics produced by exemplary embodiments 5-8 in the second embodiment category and previous comparative experiments, the tests of the strength in Mechanical Direction (MD), strength in Cross Direction (CD), rate of water absorptivity (%) and bending resistance of flexibility (mm) as well as the contact angle of fiber surface (degree), back infiltration of fiber surface (g) and time of water absorption (second) of the hygroscopic metastatic capability are respectively performed so that all foregoing parameters for samples in exemplary embodiments 5-8 are listed in following TABLE-6 while all respective corresponding parameters for samples in comparative experiments 1-4 listed in previous TABLE-4 available are still applicable for comparison here.

TABLE 6

Trait Table of Nonwoven Fabrics

| | EE = Exemplary Embodiment:------:(2nd embodiment category) | | | |
|---|---|---|---|---|
| | EE 5 | EE 6 | EE 7 | EE 8 |
| BW (g/m$^2$) | 44.9 | 42.3 | 40.2 | 39.9 |
| TK (mm) | 0.35 | 0.32 | 0.3 | 0.29 |
| AFD (um) | 2.7 | 2.8 | 2.6 | 2.9 |
| SMD (Kgf) | 14.4 | 13.9 | 12.4 | 12.1 |
| SCD (Kgf) | 6.8 | 5.9 | 5.7 | 5.7 |
| WA (%) | 220.9 | 214.2 | 210.8 | 233.1 |
| TBR (cm) | 40 | 38 | 30 | 34 |
| CAFS (degree) | 130 | 126 | 119 | 131 |
| BIFS (g) | 0.3 | 0.4 | 0.7 | 0.3 |
| TWA (second) | 25 | 29 | 30 | 15 |

Notation
BW denotes to basis weight of nonwoven
TK denotes to thickness
AFD denotes to average of fiber diameter
SMD denotes to strength in machine direction (MD)
SCD denotes to strength in cross direction (CD)
WA denotes to water absorptivity of nonwoven
TBR denotes to test in bending resistance
AVS denotes to airflow velocity stretch
CAFS denotes to contact angle of fiber surface (BP)
BIFS denotes to back infiltration of fiber surface (BP)
TWA denotes to time of water absorption As overall parameter comparisons with all corresponding parameters in previous TABLE-4 of the comparative experiments 1-4 previously illustrated for the nonwoven fabrics produced by the exemplary embodiments 1-4 in the first embodiment category of the present invention, the same conclusion for overall parameter comparisons with all corresponding parameters in previous TABLE-4 of the comparative experiments 1-4 for the nonwoven fabrics produced by the exemplary embodiments 5-8 in the second embodiment category of the present invention can be obtained by the same token that not only the hygroscopic metastatic feature for the nonwoven fabrics produced by the exemplary embodiments 5-8 in the second embodiment category of the present invention is better than that for the nonwoven fabrics in the comparative experiments 1-4, but also the strengths, bending resistance of flexibility (BRF) and rate of water absorptivity (RWA) for the nonwoven fabrics produced by the exemplary embodiments 5-8 in the second embodiment category of the present invention are better than those for the nonwoven fabrics in the comparative experiments 1-4.

Accordingly, the nonwoven fabrics produced by the melt-blown method of the present invention indeed have superiority of hygroscopic metastatic feature over conventional nonwoven fabrics. Particularly, the innovative filament composite nonwoven fabric 100 of a water absorbent layer or hydrophilic layer 102 and a hydrophobic layer 101 in form of overlaid lamination, wherein, the water absorbent layer 102 is made of natural cellulose from pulp with high water absorptivity or water absorbency while the water hydrophobic layer 101 is made of melt from bio-polyamide 6,10 with high water repellency and low water content so that the water absorbent layer 102 has hygroscopic metastatic capability to absorb the moisture in the hydrophobic layer 101 to keep the surface thereof in dry condition. By increasing the contents of the bio-polyamide 6,10 blown, the effects of the water repellency and hygroscopic metastatic capability from the hydrophobic layer 101 of the bio-polyamide 6,10 is enhanced. Thus, if water with moisture is contained the nonwoven fabric 100, the water in the hydrophobic layer 101 thereof is immediately dispelled out the surface of the hydrophobic layer 101 while the moisture contained therein is absorbed and kept by the high water absorptivity or water absorbency natural cellulose filaments of the water absorbent layer 102 by capillarity so that not only the wet feeling on the surface of the hydrophobic layer 101 is decreased but also the dry condition of the hydrophobic layer 101 is maintained for the nonwoven fabric 100.

Figure 10:
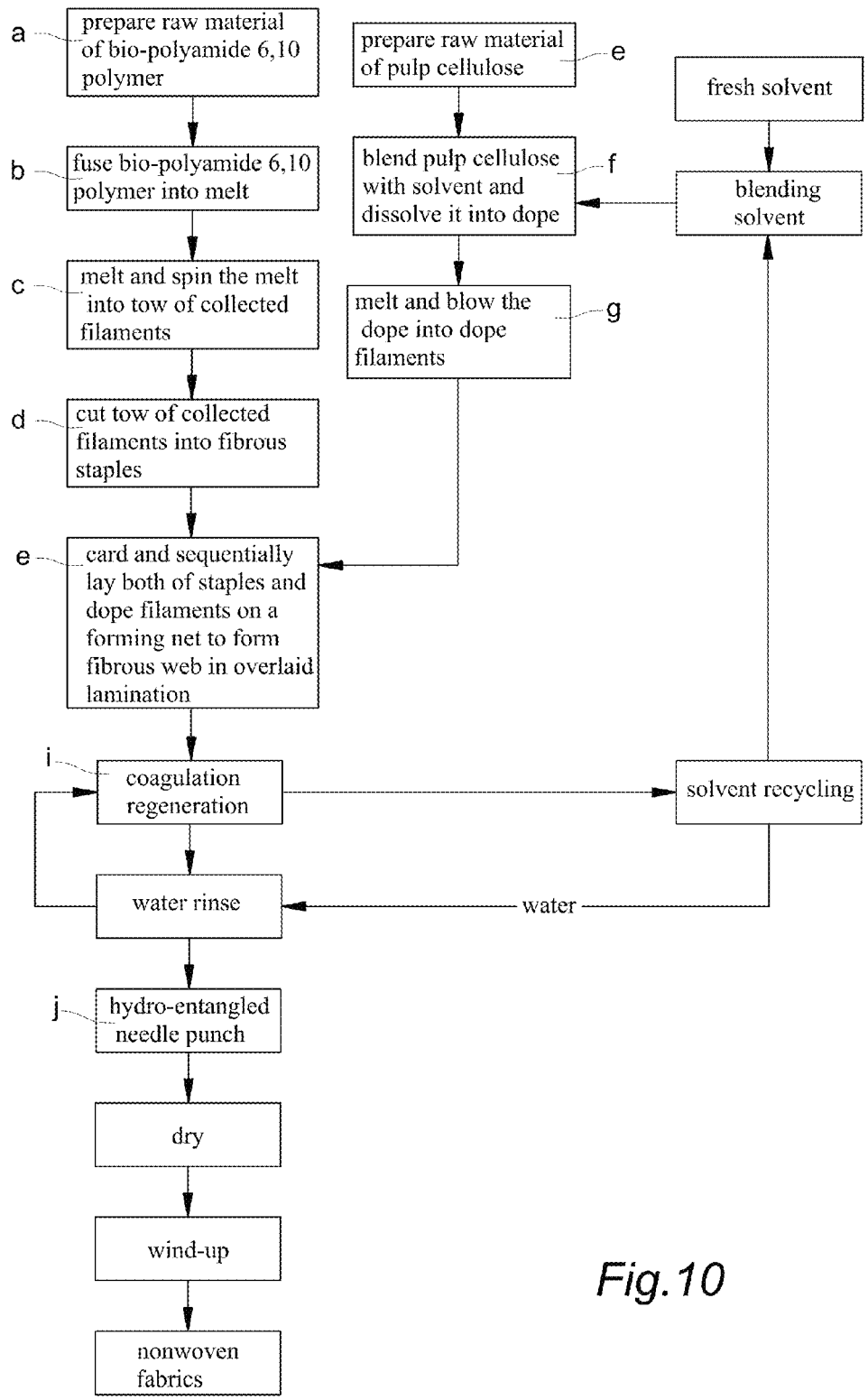
FIG. 10 is the other flow chart of block diagram showing the fabricating process for the third embodiment category in meltblown method of the present invention.
Figure 11:
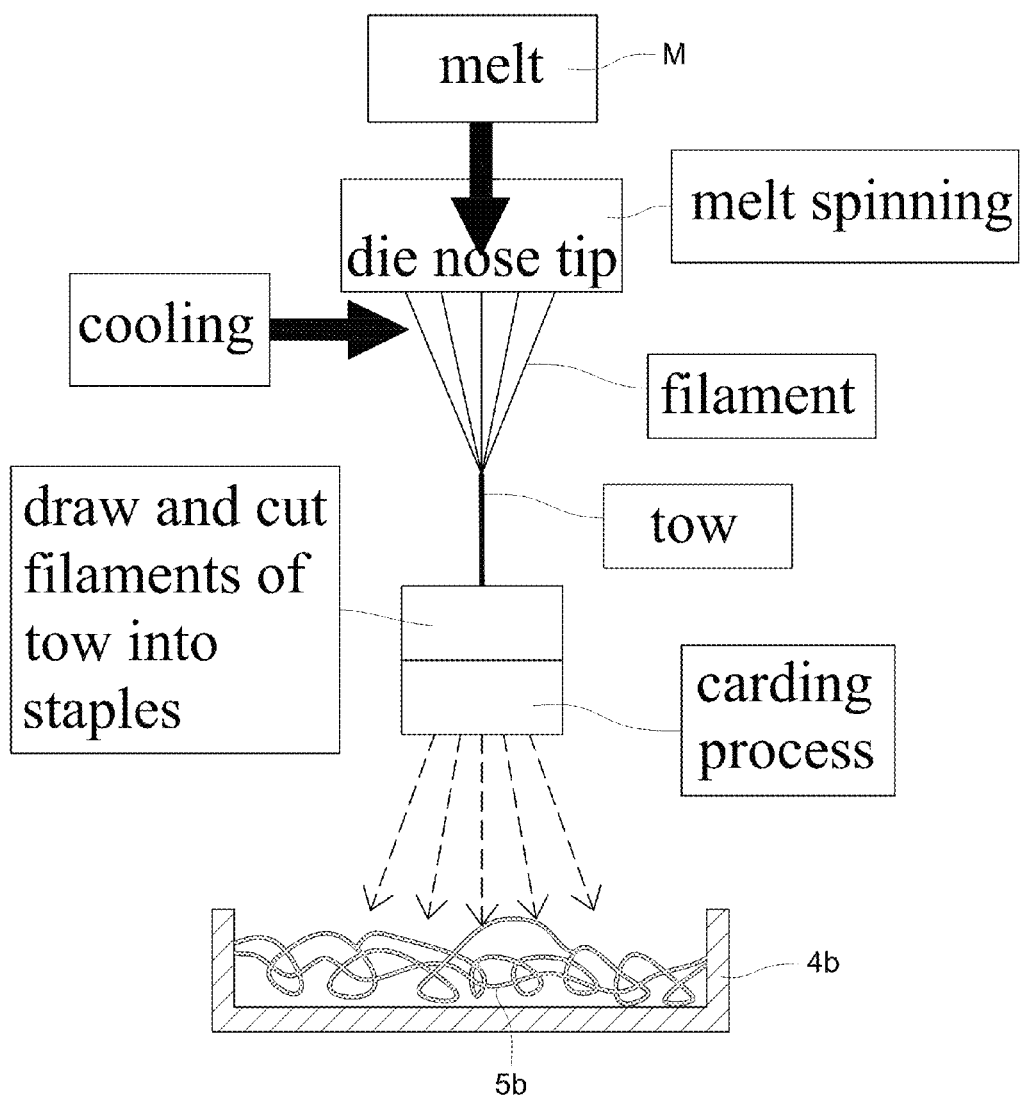
FIG. 11 is the other operational schematic view showing a forming process in fibers from bio-polyamide 6,10 for the third embodiment category in melt spinning method with staple-cutting and carding steps of the present invention.
Figure 12:
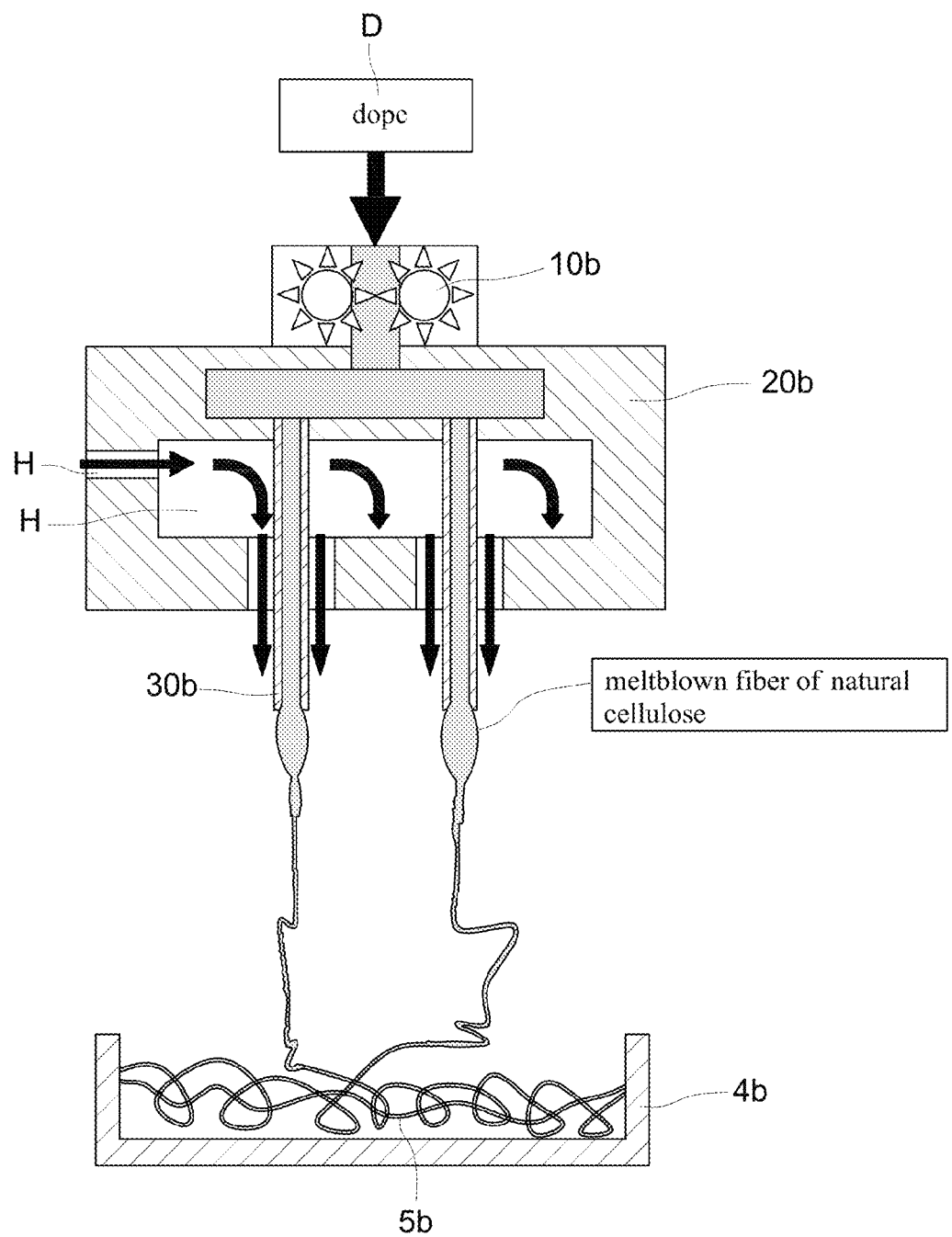
FIG. 12 is the other operational schematic view showing a forming process in fibers from natural cellulose for the third embodiment category in the meltblown method of the present invention.
Figure 13:
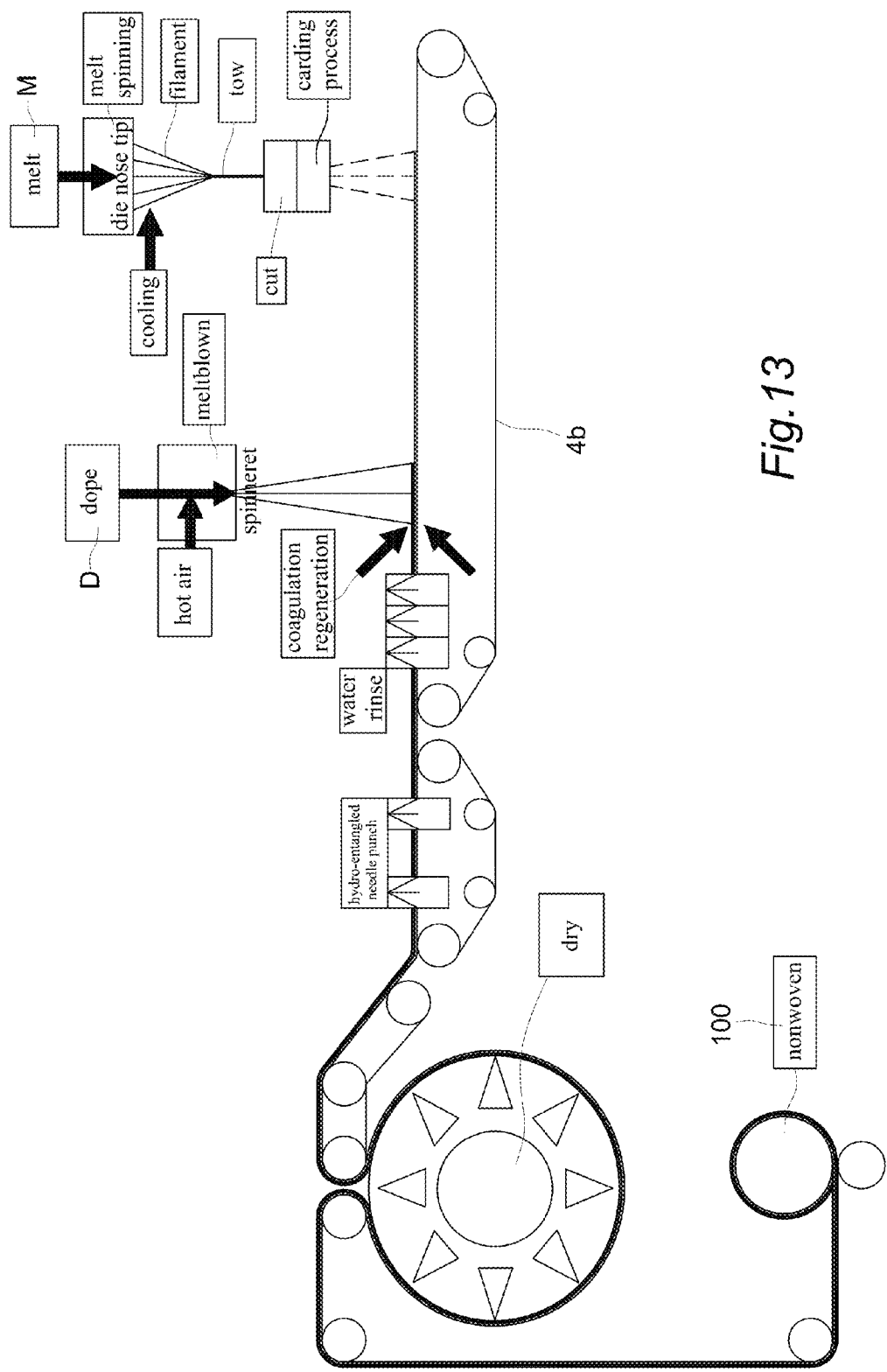
FIG. 13 is the other fabrication processing view showing an overall meltblown method for the third embodiment category of the present invention.

FIGS. 10 to 13 show the fabricating process for the third embodiment category in meltblown method of the present invention, wherein the fabricating process of the meltblown method comprises following steps.

a. Prepare macromolecule polymer of bio-polyamide 6,10 as raw material;

b. Fuse the bio-polyamide 6,10 into a melt M of molten substance under high temperature in range of 250-280 degree centigrade (250-280° C.);

c. Via melt spinning method, the melt M is firstly fed into and extruded out of an extruder (not shown), next the melt M is fed into a spin-pack and forcedly spun out of spin heads into filaments as shown in FIG. 11, then certain compressed quenching air is continuously injected in for cooling and drawing the filaments into fibrous tow of bio-polyamide 6,10 by collecting means, wherein, the extruding quantity of the extruder is in range of 100-50,000 c.c./min, and the range for temperature of the quenching air is 15 to 25 degrees centigrade (15° C.-25° C.) respectively;

d. Extend the fibrous tow of bio-polyamide 6,10 into certain specification of fiber size, then cut the filaments in the fibrous tow of bio-polyamide 6,10 into staples of bio-polyamide 6,10 with specific length;

e. Card and spread the staples of bio-polyamide 6,10 on a conveyer 4b to form a substrate fibrous web 5b with thickness in range of 0.3-2.5 mm (as shown in FIGS. 11 and 13);

f. Prepare pulp as raw material with content cellulose over 65% and degree of polymerization (DP) in range of 500-1500;

g. By putting N-methylmorpholine N-oxide (NMMO) as dissolving solvent into prepared pulp for high speed blending and dissolving under low temperature in range from 60 to 90 degrees centigrade (60° C.-90° C.) by horizontal dope blending machine by means of cellulose features of high expanding, moistening and dissolving ability as well as high rate of dissolving speed to expedite mutually blending and dissolving effect, then dehydrate it via heating up to temperature in range from 80 to 120 degrees centigrade (80° C.-120° C.) by vacuum film evaporator for 5 minutes to decrease water content thereof down to 5-13% so that a homogenized mucilaginous dope D is formed;

h. Via meltblown method, the dope D is firstly fed into and extruded out of an extruder (not shown), next the dope D is fed into a die assembly 20b by means of a gear pump 10b as shown in FIG. 12, where certain high velocity hot air H is continuously injected in for affecting the dope D by circulation therein and the hot air H is discharged out via surrounding of spinnerets 30b, then the dope D is forcedly blown out the spinnerets 30b to form uniform fine natural cellulose filament bundle, which is laid up over existing fibrous web 5b of bio-polyamide 6,10 on the conveyer 4b in step e so that a fibrous composite web 5b of the bio-polyamide 6,10 and natural cellulose in overlaid lamination is formed thereon (as shown in FIGS. 12 and 13), wherein, the extruding quantity of the extruder is in range of 100-50,000 c.c./min, as well as the ranges for airflow pressure, speed and temperature of the hot air H are 0.01-0.50 Mpa, 2-30 m/s and 120 to 250 degrees centigrade (120° C.-250° C.) respectively;

i. The fibrous composite of the bio-polyamide 6,10 and natural cellulose is coagulated with regeneration by means of ejecting mist aerosol of water, then the dissolving solvent of N-methylmorpholine N-oxide (NMMO) is washed out by water rinsing (as shown in FIGS. 10 and 13); and j. After post treatments of hydro-entangled needle punching, drying, winding-up processes have been orderly applied, then the fibrous composite web 5b of the bio-polyamide 6,10 and natural cellulose is converted into nonwoven fabric of continuous filament with hygroscopic metastatic feature (as shown in FIGS. 10 and 13).

Wherein, the raw material pulp in step f can be categorized into four groups of soft wood pulp, hard wood pulp, cotton pulp, bamboo pulp, or any combination of two pulps selected from foregoing four groups so long as the content cellulose is over 65% and degree of polymerization (DP) is in range of 500-1500.

Moreover, the fiber size for the fiber of bio-polyamide 6,10 in step d is 1-15 um, and the concentration of the dissolving solvent N-methylmorpholine N-oxide (NMMO) in foregoing step g is in range of 45%-75% while the ranges for the content of cellulose, viscosity and melting index of the dope D in foregoing step g are 6 wt %-15 wt %, 300-3000 (poise) and 200-1000 respectively.

In order to further prove the features and practical effects for the third embodiment category of the present invention, four exemplary embodiments 9-12 covering key parameters have been performed, which are detailed described below with genuine testing data.

Exemplary Embodiment 9

Firstly, fuse prepared macromolecule polymer of bio-polyamide 6,10 raw material into a melt of molten substance under high temperature at 280 degree centigrade (280° C.), via melt spinning method, extrude the melt out by an extruder with extruding quantity thereof is 300 c.c./min, and the melt is forcedly spun out of spin heads into filaments, then external compressed quenching air of 20 degrees centigrade (20° C.) is continuously blown through for cooling and drawing the filaments into fibrous tow of bio-polyamide 6,10 by collecting means, and extend and cut the filaments in the fibrous tow of bio-polyamide 6,10 into staples, then card and spread the staples of bio-polyamide 6,10 on a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 44.8 g/m$^2$ by orderly applying post treatments of hydro-entangled needle punching, drying, winding-up processes. Besides, all related processing parameters aforesaid are summed up and tabulated into following Table-7 as shown.

Exemplary Embodiment 10

Firstly, fuse prepared macromolecule polymer of bio-polyamide 6,10 raw material into a melt of molten substance under high temperature at 280 degree centigrade (280° C.), via melt spinning method, extrude the melt out by an extruder with extruding quantity thereof is 250 c.c./min, and the melt is forcedly spun out of spin heads into filaments, then external compressed quenching air of 20 degrees centigrade (20° C.) is continuously blown through for cooling and drawing the filaments into fibrous tow of bio-polyamide 6,10 by collecting means, and extend and cut the filaments in the fibrous tow of bio-polyamide 6,10 into staples, then card and spread the staples of bio-polyamide 6,10 on a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 42.1 g/m$^2$ by orderly applying post treatments of hydro-entangled needle punching, drying, winding-up processes. Besides, all related processing parameters aforesaid are summed up and tabulated into following Table-7 as shown.

Exemplary Embodiment 11

Firstly, fuse prepared macromolecule polymer of bio-polyamide 6,10 raw material into a melt of molten substance under high temperature at 280 degree centigrade (280° C.), via melt spinning method, extrude the melt out by an extruder with extruding quantity thereof is 225 c.c./min, and the melt is forcedly spun out of spin heads into filaments, then external compressed quenching air of 20 degrees centigrade (20° C.) is continuously blown through for cooling and drawing the filaments into fibrous tow of bio-polyamide 6,10 by collecting means, and extend and cut the filaments in the fibrous tow of bio-polyamide 6,10 into staples, then card and spread the staples of bio-polyamide 6,10 on a conveyer to form a substrate fibrous web; next, blend and dissolve prepared pulp in degree of polymerization 500 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 375 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 40.8 g/m$^2$ by orderly applying post treatments of hydro-entangled needle punching, drying, winding-up processes. Besides, all related processing parameters aforesaid are summed up and tabulated into following Table-7 as shown.

Exemplary Embodiment 12

Firstly, fuse prepared macromolecule polymer of bio-polyamide 6,10 raw material into a melt of molten substance under high temperature at 280 degree centigrade (280° C.), via melt spinning method, extrude the melt out by an extruder with extruding quantity thereof is 300 c.c./min, and the melt is forcedly spun out of spin heads into filaments, then external compressed quenching air of 20 degrees centigrade (20° C.) is continuously blown through for cooling and drawing the filaments into fibrous tow of bio-polyamide 6,10 by collecting means, and extend and cut the filaments in the fibrous tow of bio-polyamide 6,10 into staples, then card and spread the staples of bio-polyamide 6,10 on a conveyer to form a substrate fibrous web; next, blend and dissolve prepared pulp in degree of polymerization 750 by putting N-methylmorpholine N-oxide (NMMO) dissolving solvent into prepared pulp under temperature at 60 degrees centigrade (60° C.), then dehydrate it via heating up to temperature at 120 degrees centigrade (120° C.) by vacuum film evaporator for 5 minutes to decrease water content thereof down to 5-13% so that a homogenized mucilaginous dope is formed, then extrude the dope out by an extruder with extruding quantity thereof is 300 c.c./min, and affect the dope by continuously injecting high velocity hot air with airflow pressure and speed thereof are 0.3 Mpa and 25 m/sec respectively, then forcedly blow the dope out spinnerets to form uniform fine natural cellulose filament bundle, which is laid up over existing fibrous web of bio-polyamide 6,10 on the conveyer so that a fibrous composite of the bio-polyamide 6,10 and natural cellulose in overlaid lamination is formed thereon; and finally, coagulate and regenerate the fibrous composite of the bio-polyamide 6,10 and natural cellulose by means of ejecting mist aerosol of water, and convert it into nonwoven fabric of continuous filament with hygroscopic metastatic feature with basis weight of 39.8 g/m² by orderly applying post treatments of hydro-entangled needle punching, drying, winding-up processes. Besides, all related processing parameters aforesaid are summed up and tabulated into following Table-7 as shown.

TABLE 7

Setting Table for Parameters of Process

| | EE = Exemplary Embodiment:------:(3rd embodiment category) | | | | | | | |
|---|---|---|---|---|---|---|---|---|
| | EE 9 | | EE 10 | | EE 11 | | EE 12 | |
| | BP | PC | BP | PC | BP | PC | BP | PC |
| DP | — | 500 | — | 500 | — | 500 | — | 750 |
| EQE (c.c./min) | 300 | 375 | 250 | 375 | 225 | 375 | 300 | 300 |
| HT (° C.) | 280 | 120 | 280 | 120 | 280 | 120 | 280 | 120 |
| AFP (Mpa) | — | 0.3 | — | 0.3 | — | 0.3 | — | 0.3 |
| AFV (m/s) | — | 25 | — | 25 | — | 25 | — | 25 |
| TQA (° C.) | 20 | — | 20 | — | 20 | — | 20 | — |
| BW (g/m²) | 44.8 | | 42.1 | | 40.8 | | 39.8 | |

Notation
BP denotes to bio-polyamide 6,10
PC denotes to pulp cellulose
DP denotes to degree of polymerization
EQE denotes to extruding quantity of extruder
HT denotes to heating temperature
AFP denotes to airflow pressure
AFV denotes to airflow velocity
TQA denotes to temperature of cooling/quenching air
AVS denotes to airflow velocity stretch
BW denotes to basis weight of nonwoven In order to practically compare detailed properties of foregoing nonwoven fabrics produced by exemplary embodiments 9-12 in the third embodiment category and previous comparative experiments, the tests of the strength in Mechanical Direction (MD), strength in Cross Direction (CD), rate of water absorptivity (%) and bending resistance of flexibility (mm) as well as the contact angle of fiber surface (degree), back infiltration of fiber surface (g) and time of water absorption (second) of the hygroscopic metastatic capability are respectively performed so that all foregoing parameters for samples in exemplary embodiments 9-12 are listed in following TABLE-8 while all respective corresponding parameters for samples in comparative experiments 1-4 listed in previous TABLE-4 available are still applicable for comparison here.

TABLE 8

Trait Table of Nonwoven Fabrics

| | EE = Exemplary Embodiment:------:(3rd embodiment category) | | | |
|---|---|---|---|---|
| | EE 9 | EE 10 | EE 11 | EE 12 |
| BW (g/m²) | 44.8 | 42.1 | 40.8 | 39.8 |
| TK (mm) | 0.35 | 0.32 | 0.3 | 0.29 |
| AFD (um) | 2.8 | 2.9 | 2.7 | 3 |
| SMD (Kgf) | 14.3 | 13.8 | 12.8 | 12.1 |
| SCD (Kgf) | 6.7 | 5.8 | 5.6 | 5.7 |
| WA (%) | 220.7 | 214.1 | 210.5 | 233.1 |
| TBR (cm) | 40 | 38 | 30 | 34 |
| CAFS (degree) | 130 | 126 | 119 | 131 |

TABLE 8-continued

Trait Table of Nonwoven Fabrics

| | EE = Exemplary Embodiment:------:(3rd embodiment category) | | | |
|---|---|---|---|---|
| | EE 9 | EE 10 | EE 11 | EE 12 |
| BIFS (g) | 0.3 | 0.4 | 0.7 | 0.3 |
| TWA (second) | 23 | 28 | 29 | 16 |

Notation
BW denotes to basis weight of nonwoven
TK denotes to thickness
AFD denotes to average of fiber diameter
SMD denotes to strength in machine direction (MD)
SCD denotes to strength in cross direction (CD)
WA denotes to water absorptivity of nonwoven
TBR denotes to test in bending resistance
CAFS denotes to contact angle of fiber surface (BP)
BIFS denotes to back infiltration of fiber surface (BP)
TWA denotes to time of water absorption As overall parameter comparisons with all corresponding parameters in previous TABLE-4 of the comparative experiments 1-4 previously illustrated for the nonwoven fabrics produced by the exemplary embodiments 1-4 in the first embodiment category of the present invention, the same conclusion for overall parameter comparisons with all corresponding parameters in previous TABLE-4 of the comparative experiments 1-4 for the nonwoven fabrics produced by the exemplary embodiments 9-12 in the third embodiment category of the present invention can be obtained by the same token that not only the hygroscopic metastatic feature for the nonwoven fabrics produced by the exemplary embodiments 9-12 in the third embodiment category of the present invention is better than that for the nonwoven fabrics in the comparative experiments 1-4, but also the strengths, bending resistance of flexibility (BRF) and rate of water absorptivity (RWA) for the nonwoven fabrics produced by the exemplary embodiments 9-12 in the third embodiment category of the present invention are better than those for the nonwoven fabrics in the comparative experiments 1-4.

Accordingly, the nonwoven fabrics produced by the melt-blown method of the present invention indeed have superiority of hygroscopic metastatic feature over conventional nonwoven fabrics. Particularly, the innovative filament composite nonwoven fabric 100 of a water absorbent layer or hydrophilic layer 102 and a hydrophobic layer 101 in form of overlaid lamination, wherein, the water absorbent layer 102 is made of natural cellulose from pulp with high water absorptivity or water absorbency while the water hydrophobic layer 101 is made of melt from bio-polyamide 6,10 with high water repellency and low water content so that the water absorbent layer 102 has hygroscopic metastatic capability to absorb the moisture in the hydrophobic layer 101 to keep the surface thereof in dry condition. By increasing the contents of the bio-polyamide 6,10 blown, the effects of the water repellency and hygroscopic metastatic capability from the hydrophobic layer 101 of the bio-polyamide 6,10 is enhanced. Thus, if water with moisture is contained the nonwoven fabric 100, the water in the hydrophobic layer 101 thereof is immediately dispelled out the surface of the hydrophobic layer 101 while the moisture contained therein is absorbed and kept by the high water absorptivity or water absorbency natural cellulose filaments of the water absorbent layer 102 by capillarity so that not only the wet feeling on the surface of the hydrophobic layer 101 is decreased but also the dry condition of the hydrophobic layer 101 is maintained for the nonwoven fabric 100.

Moreover, the macromolecule polymer of bio-polyamide 6,10 raw material used in foregoing first, second and third embodiment categories of the present invention, can be replaced by macromolecule polymer of Nylon 6 raw material, macromolecule polymer of Nylon 6,6 raw material, macromolecule polymer of polyester raw material, macromolecule polymer of PE raw material, macromolecule polymer of PP raw material, or macromolecule polymer of polylactic acid raw material. Besides, the nonwoven fabric produced in foregoing first, second and third embodiment categories of the present invention, other than the intrinsic hygroscopic metastatic feature inclusively, can achieve beneficial effect in reducing total consumptive quantity of macromolecule polymer of Nylon 6 raw material, macromolecule polymer of Nylon 6,6 raw material, macromolecule polymer of polyester raw material, macromolecule polymer of PE raw material, macromolecule polymer of PP raw material, or macromolecule polymer of polylactic acid raw material because it originally use natural pulp as raw material. Therefore, the present invention not only decreases the traditional dependence on the source of raw material from petrochemical industry but also reduces the malignant impact to the environmental protection.

In conclusion all disclosures heretofore, the nonwoven fabrics produced of the present invention with innovative filament composite overlaid lamination of a hydrophilic layer and a hydrophobic layer not only have the intrinsic hygroscopic metastatic feature inclusively due to high water absorbency in the water absorbent layer of natural pulp and high water repellency in the water hydrophobic layer of bio-polyamide 6,10 but also can reduces the malignant impact to the environmental protection due to decreasing traditional dependence on the source of raw material from petrochemical industry, in addition to adequately recycled nontoxic dissolving solvent of N-methylmorpholine N-oxide (NMMO), which meet basic criterion of patentability. Accordingly, we submit the application for the patent of the present invention for your perusal in accordance with related patent laws.

What is claimed is:

1. A meltblown method for producing a nonwoven fabric with hygroscopic metastatic features comprising the following steps:
   a. preparing a raw material comprising a macromolecule polymer of bio-polyamide 6,10;
   b. fusing the macromolecule polymer of bio-polyamide 6,10 of step a. into a melt at a temperature of 250-280° C.;
   c. melt blowing the melt of step b. by blowing the melt from spinnerets to form bio-polyamide 6,10 filaments;
   d. blowing the bio-polyamide 6,10 filaments of step c. onto a conveyer to form a substrate fibrous web with a thickness of 0.3-2.5 mm;
   e. preparing a raw material comprising pulp with a cellulose content of over 65% and a degree of polymerization (DP) of 500-1500;
   f. dissolving the pulp of step e. with N-methylmorpholine N-oxide (NMMO) by blending the pulp with NMMO at a temperature of 60° C.-90° C., then dehydrating the dissolved pulp by heating to 80° C.-120° C. to form a homogenized mucilaginous dope;
   g. melt blowing the dope of step f. by blowing the dope from spinnerets and laying up over the substrate fibrous web of step d. to form a fibrous composite web of the bio-polyamide 6,10 and cellulose in overlaid lamination;
   h. regenerating the fibrous composite web of step f. by misting the web with aerosolized water, then washing out the NMMO by rinsing with water;
   i. treating the regenerated fibrous composite web of step h. by needle punching, drying, and winding-up to obtain the nonwoven fabric with hygroscopic metastatic features.

2. The method of claim 1, wherein in step f. the dissolved pulp is heated for 5 minutes to decrease the water content thereof down to 5-13%.

3. The method of claim 1, wherein step c. comprises:
   (i) feeding the melt of step b. into an extruder;
   (ii) extruding the melt out of the extruder and into a die assembly, wherein hot air is continuously injected into the die assembly and discharged through spinnerets; and
   (iii) blowing the melt out of spinnerets to form the bio-polyamide 6,10 filaments, wherein:
   the extruding quantity of the extruder is 100-50,000 c.c./min, and the ranges for airflow pressure, speed and temperature of the hot air are 0.01-0.50 Mpa, 2-100 m/s and 250-350° C., respectively.

4. The method of claim 1, wherein step g. comprises:
   (i) feeding the dope of step f. into an extruder;
   (ii) extruding the dope out of the extruder and into a die assembly, wherein hot air is continuously injected into the die assembly and discharged through spinnerets;
   (iii) blowing the dope out of spinnerets to form the fibrous composite web, wherein:
   the extruding quantity of the extruder is 100-50,000 c.c./min, and the ranges for airflow pressure, speed and temperature of the hot air are 0.01-0.50 Mpa, 2-30 m/s and 120-250° C., respectively.

5. The method of claim 1, wherein said pulp of step e. is selected from the group consisting of soft wood pulp, hard wood pulp, cotton pulp, bamboo pulp, and any combination thereof.

6. The method of claim 1, wherein the NMMO in step f. is at a concentration of 45%-75%, and the ranges for the content of cellulose, viscosity and melting index of the dope are 6 wt %-15 wt %, 300-3000 (poise) and 200-1000, respectively.

7. A method for producing a nonwoven fabric with hygroscopic metastatic features comprising the following steps:
   a. preparing a raw material comprising a macromolecule polymer of bio-polyamide 6,10;
   b. fusing the macromolecule polymer of bio-polyamide 6,10 of step a. into a melt at a temperature of 250-280° C.;
   c. spun bonding the melt of step b. by spinning the melt from spin nozzles to form bio-polyamide 6,10 filaments;
   d. using an airflow draw jet device or airflow draw stretcher to lay the bio-polyamide 6,10 filaments of step d. onto a conveyer to form a substrate fibrous web with a thickness of 0.3-2.5 mm;
   e. preparing a raw material comprising pulp with a cellulose content of over 65% and a degree of polymerization (DP) of 500-1500;
   f. dissolving the pulp of step e. with N-methylmorpholine N-oxide (NMMO) by blending the pulp with NMMO at a temperature of 60° C.-90° C., then dehydrating the dissolved pulp by heating to 80° C.-120° C. to form a homogenized mucilaginous dope;
   g. melt blowing the dope of step f. by blowing the dope from spinnerets and laying up over the substrate fibrous web of step d. to form a fibrous composite web of the bio-polyamide 6,10 and cellulose in overlaid lamination;

h. regenerating the fibrous composite web of step f. by misting the web with aerosolized water, then washing out the NMMO by rinsing with water;

i. treating the regenerated fibrous composite web of step h. by needle punching, drying, and winding-up to obtain the nonwoven fabric with hygroscopic metastatic features.

8. The method of claim 7, wherein step c. comprises:
(i) feeding the melt of step b. into an extruder:
(ii) extruding the melt out of the extruder and into a spin-pack, wherein external compressed quenching air is continuously blown through the spin-pack via an air gap; and
(iii) spinning the melt out of spin nozzles to form the bio-polyamide 6,10 filaments, wherein:
the extruding quantity of the extruder is 100-50,000 c.c./min, and the ranges for air gap, temperature and relative humidity of the quenching air are 2-30 cm, 15-25° C. and 60%-99%, respectively.

9. The method of claim 7, wherein in step d., the drawing velocity of said airflow draw jet device or airflow draw stretcher is 20-3,000 m/min.

10. The method of claim 7, wherein step g. comprises:
(i) feeding the dope of step f. into an extruder;
(ii) extruding the dope out of the extruder and into a die assembly, wherein hot air is continuously injected into the die assembly and discharged through spinnerets;
(iii) blowing the dope out of spinnerets to form the fibrous composite web, wherein:
the extruding quantity of the extruder is 100-50,000 c.c./min, and the ranges for airflow pressure, speed and temperature of the hot air are 0.01-0.50 Mpa, 2-30 m/s and 120-250° C., respectively.

11. The method of claim 7, wherein the pulp of step e. is selected from the group consisting of soft wood pulp, hard wood pulp, cotton pulp, bamboo pulp, and any combination thereof.

12. The method of claim 7, wherein the NMMO in step f. is at a concentration of 45%-75%, and the ranges for the content of cellulose, viscosity and melting index of the dope are 6 wt %-15 wt %, 300-3000 (poise) and 200-1000, respectively.

13. A method for producing a nonwoven fabric with hygroscopic metastatic features comprising the following steps:
a. preparing a raw material comprising a macromolecule polymer of bio-polyamide 6,10;
b. fusing the macromolecular polymer of bio-polyamide 6,10 of step a. into a melt at a temperature of 250-280° C.;
c. melt spinning the melt of step b. by feeding the melt into a spin-pack and spinning the melt from spin heads to form bio-polyamide 6,10 fibers;
d. extending the fibrous tow of the bio-polyamide 6,10 fibers of step c., then cutting the fibers to form staples of bio-polyamide 6,10;
e. carding and spreading the staples of bio-polyamide 6,10 of step d. on a conveyer to form a substrate fibrous web with a thickness of 0.3-2.5 mm;
f. preparing a raw material comprising pulp with a cellulose content of over 65% and a degree of polymerization (DP) of 500-1500;
g. dissolving the pulp of step f. with N-methylmorpholine N-oxide (NMMO) by blending the pulp with NMMO at a temperature of 60° C.-90° C., then dehydrating the dissolved pulp by heating to 80° C.-120° C. to form a homogenized mucilaginous dope;
h. melt blowing the dope of step g. by blowing the dope from spinnerets and laying up over the substrate fibrous web of step e. to form a fibrous composite web of the bio-polyamide 6,10 and cellulose in overlaid lamination;
i. regenerating the fibrous composite web of step h. by misting the web with aerosolized water, then washing out the NMMO by rinsing with water;
j. treating the regenerated fibrous composite web of step i. by needle punching, drying, and winding-up to obtain the nonwoven fabric with hygroscopic metastatic features.

14. The method of claim 13, wherein step h. comprises:
(i) feeding the dope of step g. into an extruder;
(ii) extruding the dope out of the extruder and into a die assembly, wherein hot air is continuously injected into the die assembly and discharged through spinnerets;
(iii) blowing the dope out of spinnerets to form the fibrous composite web, wherein:
the extruding quantity of the extruder is 100-50,000 c.c./min, and the ranges for airflow pressure, speed and temperature of the hot air are 0.01-0.50 Mpa, 2-30 m/s and 120-250° C., respectively.

15. The method of claim 13, wherein in step d. the staples of bio-polyamide 6,10 are 1-15 um long.

16. The method of claim 13, wherein the pulp of step f. is selected from the group consisting of soft wood pulp, hard wood pulp, cotton pulp, bamboo pulp, and any combination thereof.

17. The method of claim 13, wherein the NMMO in step g. is at a concentration of 45%-75%, and the ranges for the content of cellulose, viscosity and melting index of the dope are 6 wt %-15 wt %, 300-3000 (poise) and 200-1000, respectively.

18. The method of claim 13, wherein step c. comprises
(i) feeding the melt of step b. into an extruder;
(ii) extruding the dope out of the extruder and into a spin pack;
(iii) spinning the melt from spin heads to form bio-polyamide 6,10 fibers; and
(iv) treating the bio-polyamide 6,10 fibers with a continuous flow of air at a temperature of 15-20° C.

* * * * *